United States Patent
Li et al.

(10) Patent No.: US 12,536,810 B2
(45) Date of Patent: Jan. 27, 2026

(54) METHOD AND APPARATUS FOR MODELING OBJECT, STORAGE MEDIUM, AND VEHICLE CONTROL METHOD

(71) Applicant: Beijing OCGen Technology Co., Ltd., Beijing (CN)

(72) Inventors: Zhichao Li, Beijing (CN); Naiyan Wang, Beijing (CN)

(73) Assignee: Beijing OCGen Technology Co., Ltd., Beijing (CN)

( * ) Notice: Subject to any disclaimer, the term of this patent is extended or adjusted under 35 U.S.C. 154(b) by 146 days.

(21) Appl. No.: 18/460,323

(22) Filed: Sep. 1, 2023

(65) Prior Publication Data

US 2024/0078814 A1    Mar. 7, 2024

(30) Foreign Application Priority Data

Sep. 6, 2022    (CN) .......................... 202211083146.8

(51) Int. Cl.
*G06V 20/58*    (2022.01)
*B60W 60/00*    (2020.01)
(Continued)

(52) U.S. Cl.
CPC ........... *G06V 20/58* (2022.01); *B60W 60/001* (2020.02); *G06T 3/40* (2013.01); *G06T 11/00* (2013.01);
(Continued)

(58) Field of Classification Search
CPC ...... G06V 20/58; G06V 10/776; G06V 10/82; G06V 2201/07; G06V 2201/08; B60W 60/001; G06T 3/40; G06T 11/00; G06T 2210/12; G06T 2210/56; G06T 7/246; G06T 7/73; G06T 2207/10016;
(Continued)

(56) References Cited

U.S. PATENT DOCUMENTS 11,113,873 B1 *    9/2021  Bosse ..................... G06T 19/20
2017/0085733 A1 *  3/2017  Ilic ...................... H04N 1/00827
(Continued)

FOREIGN PATENT DOCUMENTS

CN    112477849    3/2021
CN    112396043    4/2021

OTHER PUBLICATIONS

Extended European Search Report in European Appln. No. 23193861.4, dated Jan. 4, 2024, 8 pages.

*Primary Examiner* — Dale W Hilgendorf
*Assistant Examiner* — Frank T Glenn, III
(74) *Attorney, Agent, or Firm* — Fish & Richardson P.C.

(57) ABSTRACT

The present disclosure provides a method and apparatus for modeling an object. The method includes: obtaining a first group of point cloud frames associated with surroundings of a perception system; generating a hierarchical representation of an object in the surroundings based on the first group of point cloud frames; obtaining, from each frame of point cloud, a second group of point cloud frames associated with the surroundings, a group of points associated with the object and a first subset and a second subset of the group of points; determining, based on the first subset and the second subset, a first confidence and a second confidence; determining whether to change the hierarchical representation of the object based on the first confidence and the second confidence.

15 Claims, 10 Drawing Sheets

(51) Int. Cl.
  *G06T 3/40*    (2024.01)
  *G06T 11/00*   (2006.01)
  *G06V 10/776*  (2022.01)

(52) U.S. Cl.
  CPC ........ *G06V 10/776* (2022.01); *G06T 2210/12* (2013.01); *G06T 2210/56* (2013.01)

(58) Field of Classification Search
  CPC . G06T 2207/10028; G06T 2207/20081; G06T 2207/20084
  See application file for complete search history.

(56) References Cited

U.S. PATENT DOCUMENTS

| | | | |
|---|---|---|---|
| 2020/0193195 A1* | 6/2020  | Doria   | G06T 7/11 |
| 2021/0012116 A1* | 1/2021  | Urtasun | G06F 18/2155 |
| 2023/0289993 A1* | 9/2023  | Sun     | G06T 19/20 |
| 2023/0334809 A1* | 10/2023 | Aoki    | G01S 17/86 |

\* cited by examiner

METHOD AND APPARATUS FOR MODELING OBJECT, STORAGE MEDIUM, AND VEHICLE CONTROL METHOD

CROSS-REFERENCE TO RELATED APPLICATIONS

The present disclosure claims priority to Chinese Patent Application No. 202211083146.8, titled "METHOD AND APPARATUS FOR MODELING OBJECT, STORAGE MEDIUM, AND VEHICLE CONTROL METHOD", filed on Sep. 6, 2022, the content of which is incorporated herein by reference in its entirety.

TECHNICAL FIELD

The present disclosure relates to sensor data processing and, more particularly, to a method and apparatus for modeling an object, a storage medium, and a vehicle control method.

BACKGROUND

With the development of autonomous driving, autonomous vehicles have been applied to freight transportation and passenger transportation. Generally, a traveling autonomous vehicle senses its surroundings through its sensors, such as light detection and ranging (LiDAR) systems and cameras. An autonomous driving system in an autonomous vehicle may generate a representation (e.g., a bounding box) of an object in the surroundings based on data acquired by sensors to express the pose and/or range of the object and to determine a movement state of the object. The autonomous driving system makes decisions and plans on the traveling of the autonomous vehicle, and finally, controls the autonomous vehicle to travel as decided and planned.

For reasonable planning, the autonomous driving system needs to generate accurate representations of the object in the surroundings so as to accurately determine the movement state of the object.

SUMMARY

The present disclosure provides a method and apparatus for modeling an object, a storage medium, and a vehicle control method. As such, the object in the surroundings of a vehicle, in particular an automotive vehicle, is dynamically modeled to generate an accurate representation of the object, thereby accurately determining the movement state of the object.

In a first aspect, the present disclosure provides a method for modeling an object, including:
 obtaining (or receiving), from a perception system, a first group of point cloud frames associated with surroundings of the perception system;
 generating a hierarchical representation of an object in the surroundings based on the first group of point cloud frames, the hierarchical representation including a first representation of the object;
 obtaining (or receiving), from the perception system, a second group of point cloud frames associated with the surroundings of the perception system;
 determining, from each frame of point cloud in the second group of point cloud frames, a group of points associated with the object and a first subset and a second subset of the group of points;
 determining, based on the first subset and the second subset, a first confidence that the object includes a first part associated with the first subset and a second confidence that the object includes a second part associated with the second subset; and
 determining whether to change the hierarchical representation of the object based on the first confidence and the second confidence.

In a second aspect, the present disclosure provides an apparatus for modeling an object, including:
 an obtaining module configured to obtain (or receive), from a perception system, a first group of point cloud frames associated with surroundings of the perception system;
 a modeling module configured to generate a hierarchical representation of an object in the surroundings based on the first group of point cloud frames, the hierarchical representation including a first representation of the object;
 wherein the obtaining module is further configured to obtain (or receive), from the perception system, a second group of point cloud frames associated with the surroundings of the perception system;
 a first determining module configured to determine a group of points associated with the object and a first subset and a second subset of the group of points from each frame of point cloud in the second group of point cloud frames;
 a confidence module configured to determine, based on the first subset and the second subset, a first confidence that the object includes a first part associated with the first subset and a second confidence that the object includes a second part associated with the second subset; and
 a second determining module configured to determine whether to change the hierarchical representation of the object based on the first confidence and the second confidence.

In a third aspect, the present disclosure provides an electronic device, including a processor and a memory communicatively coupled to the processor, wherein
 the memory stores program instructions; and
 the processor executes the program instructions stored in the memory to implement the method according to the first aspect.

In a fourth aspect, the present disclosure provides a computer-readable storage medium, wherein the computer-readable storage medium stores program instructions executable by a processor to implement the method according to the first aspect.

In a fifth aspect, the present disclosure provides a computer program product, including a computer program executable by a processor to implement the method according to the first aspect.

In a sixth aspect, the present disclosure provides a vehicle control method, including:
 obtaining (or receiving), from a perception system, a first group of point cloud frames associated with surroundings of the perception system;
 generating a hierarchical representation of an object in the surroundings based on the first group of point cloud frames, the hierarchical representation including a first representation of the object;
 obtaining (or receiving), from the perception system, a second group of point cloud frames associated with the surroundings of the perception system;

determining, from each frame of point cloud in the second group of point cloud frames, a group of points associated with the object and a first subset and a second subset of the group of points;

determining, based on the first subset and the second subset, a first confidence that the object includes a first part associated with the first subset and a second confidence that the object includes a second part associated with the second subset;

determining whether to change the hierarchical representation of the object based on the first confidence and the second confidence;

generating a path (or trajectory) for the vehicle to travel along based on the hierarchical representation of the object; and controlling the vehicle to travel along the generated path (or trajectory).

According to the method and apparatus for modeling an object, the storage medium, and the vehicle control method herein, the method includes: obtaining a first group of point cloud frames associated with surroundings acquired by a perception system; generating a hierarchical representation of an object in the surroundings based on the first group of point cloud frames, the hierarchical representation including a first representation of the object; obtaining a second group of point cloud frames associated with the surroundings acquired by the perception system; determining, from each frame of point cloud in the second group of point cloud frames, a group of points associated with the object and a first subset and a second subset of the group of points; determining, based on the first subset and the second subset, a first confidence that the object includes a first part associated with the first subset and a second confidence that the object includes a second part associated with the second subset; and determining whether to change the hierarchical representation of the object based on the first confidence and the second confidence. The present disclosure makes it possible to firstly generate a hierarchical representation of an object based on a first group of point cloud frames, and then determine whether to adjust or refine the hierarchical representation of the object based on a group of points associated with the object and first and second subsets of the group of points in a second group of point cloud frames acquired subsequently, as well as corresponding confidences. As such, the representation of the object is dynamically optimized according to the observation so that the representation of the object is more accurate and stable with the observation, and then the movement state of the object may be accurately determined.

BRIEF DESCRIPTION OF THE DRAWINGS

The accompanying drawings, which are incorporated in and constitute a part of the specification, illustrate embodiments in line with the present disclosure and, in conjunction with the specification, serve to explain the principles of the present disclosure.

Figure 1A:
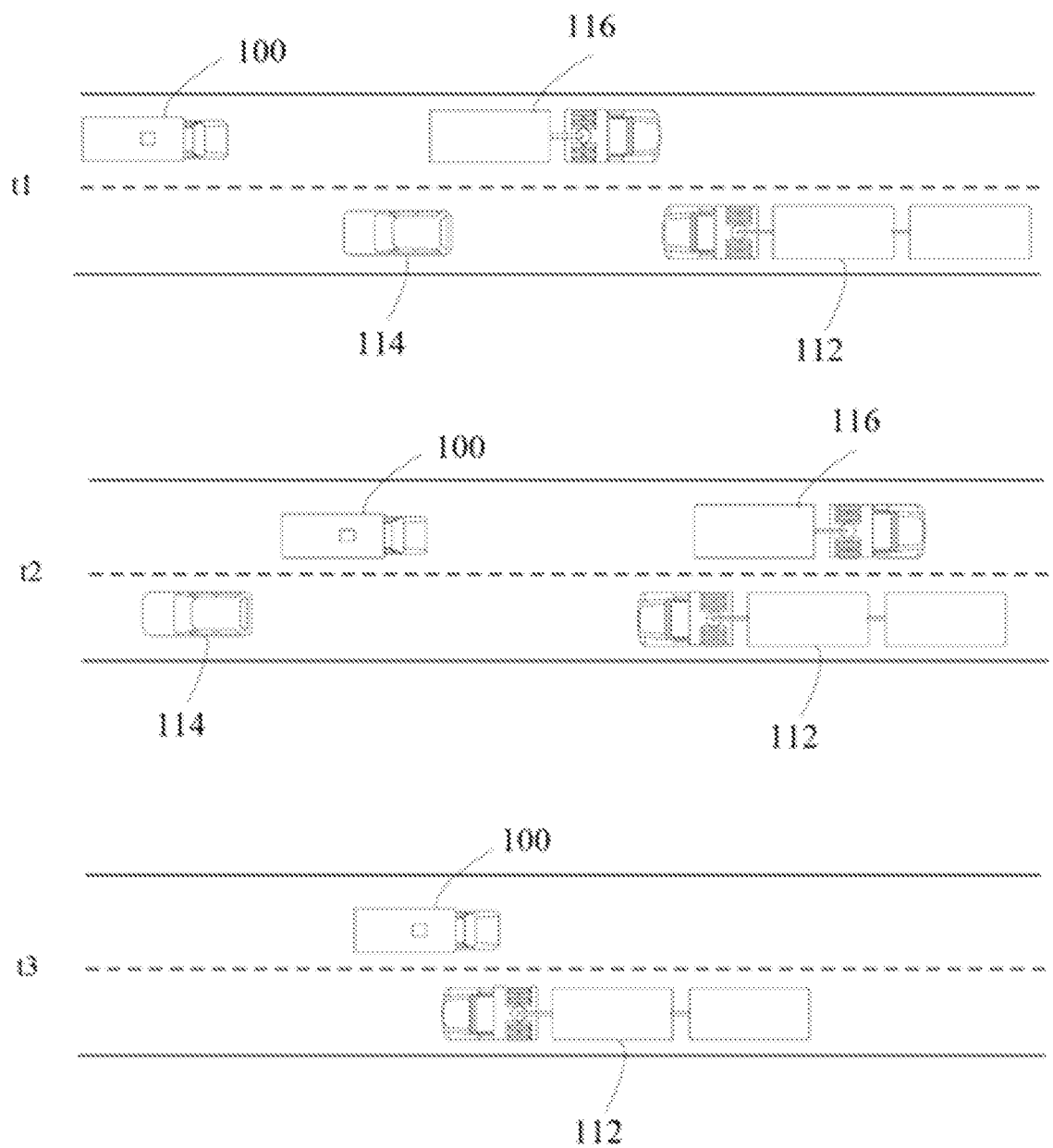
FIG. 1a shows an example scenario of the present disclosure.

Specific embodiments of the present disclosure have been shown in the above drawings and will be described in greater detail hereinafter. The drawings and written description are not intended to limit the scope of the concepts of the present disclosure in any way, but rather to illustrate the concepts of the present disclosure to one of ordinary skill in the art by reference to specific embodiments.

DETAILED DESCRIPTION

Reference will now be made in detail to exemplary embodiments, examples of which are illustrated in the accompanying drawings. Where the following description refers to the accompanying drawings, like numbers in different drawings indicate the same or similar elements, unless otherwise indicated. The embodiments described in the following illustrative examples do not represent all embodiments in line with the present disclosure. Rather, they are merely examples of the apparatus and method in line with certain aspects of the present disclosure as detailed in the appended claims.

An autonomous vehicle may include a plurality of sensors to capture sensor data corresponding to the surroundings of the vehicle. The surroundings may typically include a plurality of objects. In an object detection task, bounding boxes may be used to identify the location and size of the objects. That is to say, the objects in the surroundings may be represented as bounding boxes. For example, in a two-dimensional representation parallel to the ground, an occupied area and shape of an object in the surroundings may be approximated by a rectangular bounding box, thereby representing the object in the surroundings. It is common in the prior art to represent one object in the surroundings as one bounding box.

The object in the surroundings may be an articulated object including at least two parts connected to each other, and these parts are rotatable relative to each other. An example of the articulated object is a truck including a tractor and a trailer. The inventors of the present disclosure have noticed that if the articulated object is represented as a single bounding box (e.g., a single rectangular bounding box), the exact movement state of the articulated object cannot be obtained, which may lead to an erroneous estimation of the movement state of the articulated object. For example, when a truck turns, an angle is formed between the tractor and the trailer, and where a single bounding box is taken to represent the truck, an area of the bounding box does not match the occupied area of the truck, which may result in an overestimation of the occupied area of the truck. In particular, where the truck actually occupies only one lane, the bounding box of the truck may occupy two lanes on the map.

To solve the problem that the area of the bounding box does not match the actual occupied area of the articulated object, it is preferable to consider each part of the articulated object as an independent object represented by one bounding box. For example, the tractor and the trailer of the truck may be viewed as distinct objects that are independent of each other and are represented by different bounding boxes. Such expression is simpler, but it does not accurately express the movement pattern of the articulated object and increases the difficulty of estimating the movement state (e.g., trajectory) of the articulated object. For example, the tractor of a truck has power, while the trailer has no power, and the movement of the trailer will be constrained by the movement of the tractor. With an incorrect movement model, the trajectories of the tractor and the trailer may deviate significantly from each other in the prediction of the trajectories of the tractor and the trailer.

In addition, the applicant has noted that the positional relationship (e.g., distance and relative orientation) of the autonomous vehicle relative to the object in the surroundings changes over time, and the observation of the object by sensors on the autonomous vehicle changes accordingly. Modeling the object in the surroundings should therefore take into account changes in the relative positional relationship between the autonomous vehicle and the object in the surroundings.

The techniques described herein may be taken to process sensor data and dynamically generate a hierarchical representation of the object in the surroundings, so as to accurately represent the object, thereby navigating a vehicle, such as an autonomous vehicle, forward in the surroundings, and avoiding relevant objects in the surroundings, such as other vehicles in the surroundings.

In summary, the present disclosure provides a method for modeling an object (i.e., a method for dynamically generating a hierarchical representation of an object), and the method includes: obtaining a first group of point cloud frames associated with surroundings acquired by a perception system; generating a hierarchical representation of an object in the surroundings based on the first group of point cloud frames, the hierarchical representation including a first representation of the object; obtaining a second group of point cloud frames associated with the surroundings acquired by the perception system; determining, from each frame of point cloud in the second group of point cloud frames, a group of points associated with the object and a first subset and a second subset of the group of points; determining, based on the first subset and the second subset, a first confidence that the object includes a first part associated with the first subset and a second confidence that the object includes a second part associated with the second subset; and determining whether to change the hierarchical representation of the object based on the first confidence and the second confidence. The present disclosure makes it possible to firstly generate a representation of an object based on a first group of point cloud frames, and then determine whether to adjust or refine the representation of the object based on a group of points associated with the object and first and second subsets of the group of points in a second group of point cloud frames acquired subsequently, as well as corresponding confidences. As such, the representation of the object is dynamically optimized according to the observation so that the representation of the object is more accurate and stable with the observation, and then the movement state of the object may be accurately determined.

The method for modeling an object provided herein (i.e., the method for dynamically generating a hierarchical representation of an object) can be taken to control a vehicle. The computing device of the vehicle generates a path (or trajectory) along which the vehicle is to travel based on the hierarchical representation of the object and controls the vehicle to travel along the generated path (or trajectory).

FIG. 1a shows an example scenario at different times. As shown in FIG. 1a, at a first time, namely, t1, a vehicle 100 is traveling in one lane on the road, a truck 116 is traveling in front thereof; in another lane nearby, a truck 112 and a car 114 are traveling. At this time, the vehicle 100 is farther from the truck 112, and the view of a sensor of the vehicle 100 is partially blocked by the truck 116, hence the sensor of the vehicle 100 cannot clearly observe the vehicle 112. At a second time, namely, t2, the vehicle 100 is closer to the truck 112 than at t1, hence the sensor of the vehicle 100 can better observe the vehicle 112 than at t1. At a third time, namely, t3, the vehicle 100 is closer to the truck 112 than at t2, and the view is not blocked by other vehicles, hence the sensor of the vehicle 100 can better observe the vehicle 112 than at t2.

The vehicle 100 may be an autonomous vehicle that will consider the movement of the trucks 112 and 116 and the car 114 when planning a travel path (or trajectory). In addition, FIG. 1a also shows that the truck 112 includes a tractor and two trailers, and the truck 116 includes a tractor and one trailer.

Figure 1B:
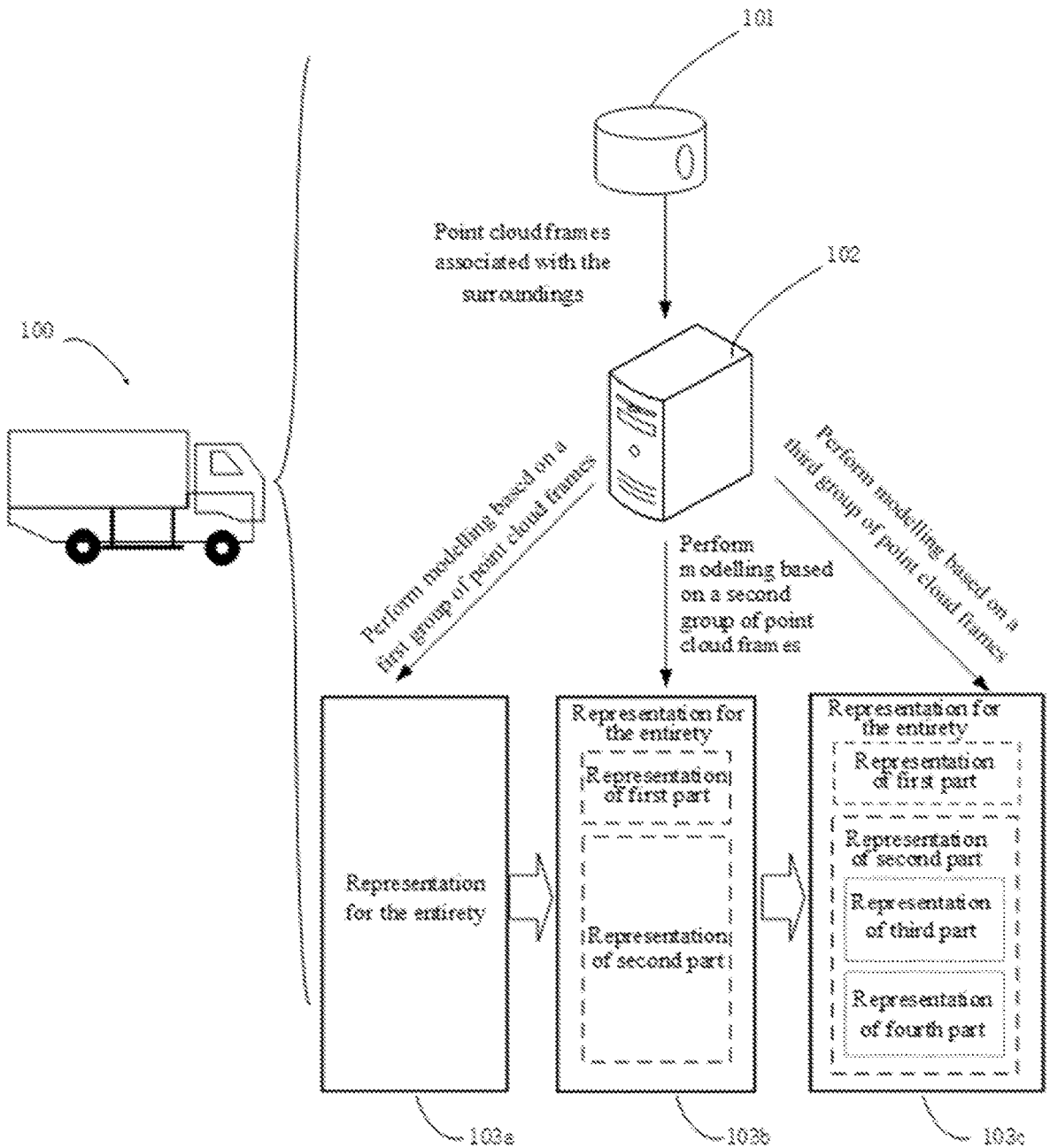
FIG. 1b is a schematic view of a vehicle according to an exemplary embodiment of the present disclosure.

FIG. 1b shows a schematic view of a vehicle (e.g., the vehicle 100 shown in FIG. 1a) according to an exemplary embodiment of the present disclosure. As shown in FIG. 1b, the vehicle 100 includes a perception system 101 and a computing device 102. The perception system 101 is a sensor system and may include a plurality of sensors, such as one or more of an inertial measurement unit (IMU,) a global navigation satellite system (GNSS) transceiver (e.g., a global positioning system (GPS) transceiver), a radio detection and ranging (RADAR) system, a light detection and ranging (LiDAR) system, an acoustic sensor, an ultrasound sensor, and a camera.

The perception system 101 acquires sensor data associated with the surroundings of the vehicle 100 (i.e., the surroundings of the perception system 101). For example, the LiDAR in the perception system 101 may acquire a point cloud associated with the surroundings of the vehicle 100, the camera in the perception system 101 may acquire an image associated with the surroundings of the vehicle 100, and the LiDAR and the camera in the perception system 101 may have overlapping fields of view such that the image acquired by the camera and the point cloud acquired by the LiDAR at the same time or nearly the same time have data about the same object.

The perception system 101 may transmit the sensor data (e.g., point cloud frames) to the computing device 102, and the computing device 102 may detect or recognize content associated with the object in the surroundings of the vehicle 100 from the sensor data. For example, the computing device 102 detects or recognizes points associated with the object in the surroundings of the vehicle 100 (e.g., the truck 112 or 116 or the car 114 of FIG. 1a) from a point cloud acquired by the LiDAR. In the case of an articulated object, the computing device 102 detects or recognizes the points corresponding to the whole object and the parts of the object from the point cloud, and generates a corresponding representation of the whole object and representations of the parts thereof, respectively, thereby generating a hierarchical representation of the object. An example of the representation of the object (i.e., the representation of the whole object) and the representation of the parts of the object is a bounding box, e.g., a rectangular bounding box.

For example, referring to FIG. 1a in combination with FIG. 1b, at t1, the vehicle 100 is farther from the truck 112. If the computing device 102 detects or recognizes the truck 112 from the point cloud frames (i.e., a first group of point cloud frames) acquired by the perception system 101 at t1, a hierarchical representation 103a of the truck 112 is generated. At this point, the vehicle 100 is farther from the truck 112, the computing device 102 may not recognize the details of the truck 112 from the first group of point cloud frames (e.g., unable to determine whether the truck includes a trailer), and therefore, the generated hierarchical representation 103 a of the truck includes only an representation of the truck 112 as a whole (hereinafter referred to as the first representation), that is, include only one bounding box. As shown in FIG. 1a, at t2, the vehicle 100 is closer to the truck 112 than at t1. If the computing device 102 detects or recognizes the truck's tractor and trailer (i.e., a first part and a second part of the truck) from the point cloud frames (i.e., a second group of point cloud frames) acquired by the perception system 101 at t2, the hierarchical representation 103a is adjusted or changed to obtain the hierarchical representation 103b of the truck 112. At this time, the vehicle 100 is closer to the truck 112, the computing device 102 may determine from the second group of point cloud frames that the truck 112 includes not only a tractor but also a trailer, but cannot determine whether the truck includes a plurality of trailers. Thus, the resulting hierarchical representation of the truck 103b include the first representation of the truck as a whole, a second representation of the truck's tractor, and a third representation of the truck's trailer. As shown in FIG. 1a, at t3, the vehicle 100 is very closer to the truck 112 than at t2 and the view is not blocked by the truck 116. If the computing device 102 detects or recognizes not only the tractor of the truck but also two trailers of the truck (i.e., third and fourth parts of the truck) from the point cloud frames (i.e., a third group of point cloud frames) acquired by the perception system 101 at t3, the hierarchical representation 103b is adjusted or changed to obtain a hierarchical representation 103c of the truck 112. At this time, the vehicle 100 is closer to the truck 112, the computing device 102 may clearly determine from the third group of point cloud frames that the truck 112 includes two trailers. Thus, the resulting hierarchical representation 103c of the truck includes the first representation of the truck as a whole, the second representation of the tractor of the truck, the third representation of the trailers of the truck (i.e., first and second trailers as a whole), a fourth representation of a first trailer of the truck, and a fifth representation of a second trailer of the truck. Accurate modeling of the truck 112 is thereby achieved. The computing device 102 may accurately determine the movement state of the truck 112 based on accurate modeling of the truck 112.

Figure 2:
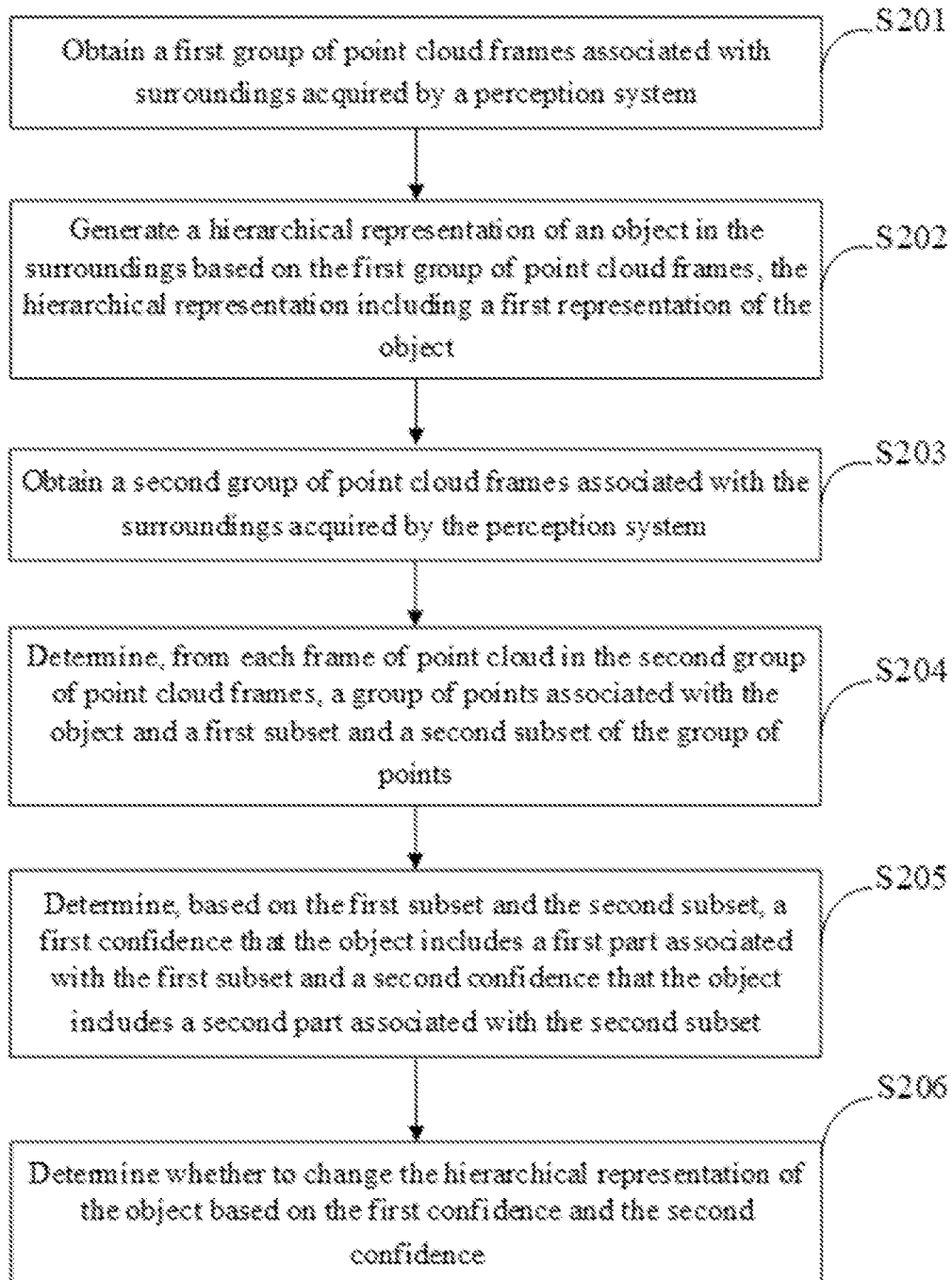
FIG. 2 is a flowchart of a method for modeling an object according to an embodiment of the present disclosure.

FIG. 2 is a flowchart of the method for modeling an object according to an embodiment of the present disclosure. The method for modeling an object herein may be implemented by any electronic device, such as the computing device 102 shown in FIG. 1b.

As shown in FIG. 2, in step S201, a first group of point cloud frames acquired by a perception system associated with the surroundings is obtained. The first group of point cloud frames includes one or more frames of point clouds.

While a vehicle (e.g., the vehicle 100 shown in FIGS. 1a and 1b) is traveling, a perception system (e.g., the perception system 101 shown in FIG. 1b) may be employed to acquire sensor data associated with the surroundings of the vehicle 100 (i.e., the surroundings of the perception system 101). The sensor data acquired by the perception system includes, for example, point clouds associated with the surroundings of the vehicle 100 acquired by a LiDAR of the perception system, and images associated with the surroundings of the vehicle 100 acquired by a camera of the perception system. The perception system 101 may transmit one or more frames of the point clouds (e.g., the first group of point cloud frames) acquired by the LiDAR to the computing device 102. In addition to point clouds, the perception system 101 may transmit one or more images acquired by the camera or data acquired by other sensors to the computing device 102.

Some objects in the surroundings (e.g., the trucks 112 and 116 of FIG. 1a) may be articulated objects, and other objects may be non-articulated objects (e.g., the car 114 of FIG. 1a). The articulated object includes at least two parts that are relatively rotatable. By way of example, the articulated object is a truck including a tractor and a trailer, where the trailer is rotatable relative to a particular point of the tractor. Where a truck includes a plurality of trailers, one trailer may rotate relative to a particular point of another trailer.

In step S 202, a hierarchical representation of an object in the surroundings is generated based on the first group of point cloud frames, where the hierarchical representation includes the first representation of the object.

After the computing device 102 receives the sensor data including the first group of point cloud frames from the perception system 101, the computing device 102 may perform object detection on the first group of point cloud frames using various object detection methods, and may determine a group of points associated with the object in the surroundings of the vehicle, such as the truck 112 of FIG. 1a, from the first group of point cloud frames.

When the perception system 101 acquires the first group of point cloud frames, if the vehicle 100 is far from the object or the object is partially blocked, the observation of the object by the sensors in the perception system 101 may be unclear or only a part of the object may be observed. In this case, the computing device 102 cannot determine whether the object includes at least two relatively rotatable parts based on the first group of point cloud frames, and the representation of the object as a whole (i.e., the first representation of the object) constitutes the hierarchical representation of the object. That is, the hierarchical representation of the object now includes only the first representation of the object. For example, when the perception system 101 acquires the first group of point cloud frames at t1 of FIG. 1a, the sensors of the vehicle 100 may only observe the tractor of the truck 112 and not the trailer of the truck 112. The computing device 102 may determine a group of points associated with the truck 112 as a basis to generate an representation of the truck 112 as a whole. In this case, the representation of the truck 112 as a whole constitutes the hierarchical representation of the truck 112.

An example of the first representation of the object is a bounding box, e.g., a rectangular bounding box.

In step S203, a second group of point cloud frames associated with the surroundings acquired by the perception system is obtained.

In this embodiment, the second group of point cloud frames associated with the surroundings is one or more frames of point clouds acquired by the perception system 101 after the first group of point cloud frames is acquired. The perception system 101 may become closer to the object, or the object is no longer blocked over time, the perception system 101 may observe more parts or details of the object, therefore, the second group of point cloud frames may reflect more parts or details of the object in further detail, and the hierarchical representation of the object may be refined according to the second group of point cloud frames if the circumstances allow.

For example, the perception system 101 acquires the first group of point cloud frames at t1 of FIG. 1a and the second group of point cloud frames after t1 and before t2 (or at t2) of FIG. 1a. The closer to t2 is the moment at which the perception system 101 acquires the second group of point cloud frames, the closer the vehicle 100 is to the truck 112, in which case the sensors of the vehicle 100 may observe the truck 112 more clearly.

In step S204, a group of points associated with the object and a first subset and a second subset of the group of points are determined from each frame of point cloud in the second group of point cloud frames.

Upon receiving the sensor data that includes the second group of point cloud frames from the perception system 101, the computing device 102 may determine a group of points that are associated with the object in the vehicle's surroundings from each frame of point cloud in the second group of point cloud frames (the object is the same as the object detected from the first group of point cloud frames), determine a plurality of subsets of the group of points, such as the first subset and the second subset, and generate representations (e.g., bounding boxes) of one or more parts of the object based on the subsets of the group of points.

Herein, the computing device 102 may perform object detection on the second group of point cloud frames using various object detection methods and determine the group of points associated with the object and the first subset and the second subset of the group of points from each frame of point cloud in the second group of point cloud frames.

In step S205, based on the first subset and the second subset, a first confidence that the object includes a first part associated with the first subset and a second confidence that the object includes a second part associated with the second subset are determined.

In the meantime or after determining the group of points associated with the object in the surroundings from each frame of point cloud in the second group of point cloud frames and determining the subsets of the group of points (e.g., the first subset and the second subset), the computing device 102 may determine a first confidence for the first subset and a second confidence for the second subset based on at least a part or all of the first subset and at least a part or all of the second subset.

In step S206, a determination is made as to whether to change the hierarchical representation of the object based on the first confidence and the second confidence.

The computing device 102 determines whether to change the hierarchical representation of the object based on the first confidence corresponding to the first subset (i.e., a confidence that the object includes the first part associated with the first subset) and the second confidence corresponding to the second subset (i.e., the confidence that the object includes the second part associated with the second subset). For example, the computing device 102 determines whether to change the hierarchical representation of the object by determining the relationship between the first and second confidences and a predetermined threshold. The predetermined threshold may be determined empirically. The first confidence and the second confidence being both low (for example, lower than the predetermined threshold) indicates that the detection result is inaccurate and to be discarded. If at least one of the first confidence and the second confidence is greater than or equal to the predetermined threshold, a determination is made to change the hierarchical representation of the object.

In some embodiments, the hierarchical representation of the object is kept unchanged in response to both the first confidence and the second confidence being less than the predetermined threshold. That is, both the first confidence and the second confidence being determined to be less than the predetermined threshold indicates that the detection result is inaccurate, that is, the first subset and the second subset determined from the group of points associated with the object are inaccurate. Therefore, the detection result is discarded, and it will not generate the representation of the first part of the object and the representation of the second part of the object based on the first subset and the second subset, with the hierarchical representation of the object generated in S202 unchanged.

In some embodiments, the representation of the object is adjusted (e.g., at least one of a size and a shape of the first representation of the object generated in step S202 is changed) in response to one of the first confidence and the second confidence being less than the predetermined threshold and the other being greater than or equal to the predetermined threshold. For example, upon determining that the first confidence is greater than or equal to the predetermined threshold and the second confidence is less than the predetermined threshold, the representation of the first part of the object is generated based on the first subset, and at the same time, at least one of the size and the shape of the first representation generated in step S202 is changed so that the first representation is the same as the representation of the first part of the object.

For example, if the first part associated with the first subset is a tractor of the truck, then the second part associated with the second subset is a trailer of the truck. The first confidence corresponding to the first subset being greater than or equal to the predetermined threshold and the second confidence corresponding to the second subset being less than the predetermined threshold indicate that the tractor is not engaged with a trailer or that the trailer is blocked. The computing device 102 may change the hierarchical representation of the object generated in step S202, that is, adjust the first representation generated in step S202 so that the hierarchical representation is the same as the representation of the tractor generated based on the first subset.

In some embodiments, the second representation of the first part of the object and the third representation of the second part of the object are generated based on the first subset and the second subset in response to both the first confidence and the second confidence being greater than or equal to the predetermined threshold. In some embodiments, the computing device 102 further adjusts the first representation of the object generated in step S202 (e.g., changes at least one of the size and the shape of the first representation of the object generated in step S202) based on the group of points associated with the object in the surroundings in the second group of point cloud frames in response to both the first confidence and the second confidence being greater than or equal to the predetermined threshold.

Determining that both the first confidence and the second confidence are greater than or equal to the predetermined threshold indicates that the perception system 101 clearly observes the articulated object and that the perception system 101 clearly observes at least two parts of the articulated object, hence the second representation of the first part of the object and the third representation of the second part of the object may be generated based on the first subset and the second subset, with the hierarchical representation of the object generated in step S202 being changed to further include the second representation of the first part and the third representation of the second part. Alternatively, the second representation of the first part of the object and the third representation of the second part of the object are located at least partially within the first representation of the object. Herein, an example of the first representation of the object and the representations of the parts of the object (i.e., the second representation and the third representation) are bounding boxes, such as rectangular bounding boxes.

As an example of FIG. 1a, if the second group of point cloud frames is acquired by the perception system 101 at t2 of FIG. 1a, the first part associated with the first subset and the second part associated with the second subset correspond to a tractor and a trailer, respectively, of the truck 112. In this case, the perception system 101 can clearly observe the tractor and the trailer, hence both the first confidence and the second confidence are greater than or equal to the predetermined threshold.

The observation of the truck 112 by the perception system 101 becomes increasingly clear from t1 to t2 in FIG. 1a, and therefore, if the second group of point cloud frames is acquired by the perception system 101 before t2 and after t1 of FIG. 1a, then the closer to t2 is the moment at which the second group of point cloud frames is acquired, the greater are the first confidence and the second confidence. The closer to t1 is the moment, the smaller are the first confidence and the second confidence.

Figure 3:
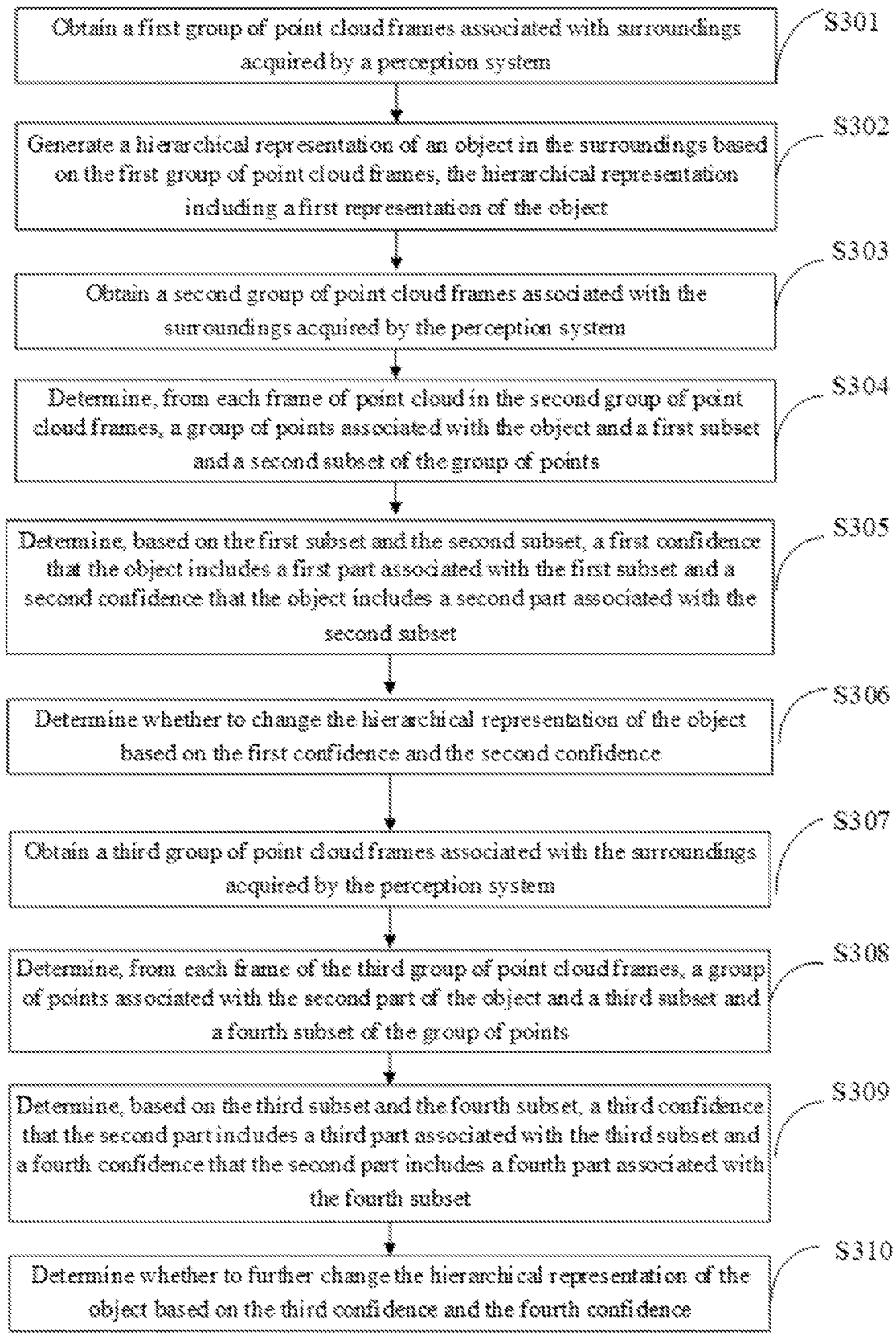
FIG. 3 is a flowchart of a method for modeling an object according to another embodiment of the present disclosure.

FIG. 3 shows a flowchart of the method for modeling an object (i.e., the method for dynamically generating a hierarchical representation of an object) according to another embodiment of the present disclosure. The method shown in FIG. 3 is implemented by any electronic device, such as the computing device 102 shown in FIG. 1b. The method of FIG. 3 models the object in more detail than the method of FIG. 2. Steps S301 to S306 in FIG. 3 are the same as steps S201 to S206 in FIG. 2, and therefore, these steps will not be described in detail below. As shown in FIG. 3, in step S301, a first group of point cloud frames acquired by a perception system associated with the surroundings is obtained. The first group of point cloud frames includes one or more frames of point clouds. In step S302, a hierarchical representation of an object in the surroundings is generated based on the first group of point cloud frames, where the hierarchical representation includes the first representation of the object. In step S303, a second group of point cloud frames associated with the surroundings acquired by the perception system is obtained. In step S304, a group of points associated with the object and a first subset and a second subset of the group of points are determined from each frame of point cloud in the second group of point cloud frames. In step S305, based on the first subset and the second subset, a first confidence that the object includes a first part associated with the first subset and a second confidence that the object includes a second part associated with the second subset are determined. In step S306, a determination is made as to whether to change the hierarchical representation of the object based on the first confidence and the second confidence.

As shown in FIG. 3, in step S307, the third group of point cloud frames associated with the surroundings acquired by the perception system is obtained.

The third group of point cloud frames associated with the surroundings is one or more frames of point clouds acquired by the perception system 101 after acquiring the second group of point cloud frames. As the perception system 101 may become closer to the object, or the object may no longer be blocked over time, the perception system 101 may observe more parts or details of the object. The third group of point cloud frames may thus reflect in further detail more parts or details of the object, and the hierarchical representation of the object may be refined based on the third group of point cloud frames if the circumstances allow.

For example, the perception system 101 acquires the second group of point cloud frames at t2 of FIG. 1a and the third group of point cloud frames after t2 and before t3 (or at t3) of FIG. 1a. The closer to t3 is the moment at which the perception system 101 acquires the third group of point cloud frames, the closer the vehicle 100 is to the truck 112, in which case the sensors of the vehicle 100 may observe the truck 112 more clearly.

In step S308, a group of points associated with the second part of the object and a third subset and a fourth subset of the group of points are determined from each frame of point cloud in the third group of point cloud frames.

The computing device 102, upon receiving the sensor data including the third group of point cloud frames from the perception system 101, may determine from the third group of point cloud frames a group of points associated with parts (e.g., the second part, such as the trailer of the truck 110 of FIG. 1a) of the object in the surroundings of the vehicle (the object being the same as the object detected from the first group of point cloud frames and the second group of point cloud frames), determine a plurality of subsets of the group of points, such as the third subset and the fourth subset (e.g., the first trailer and the second trailer of the truck), and generate representations (e.g., bounding boxes) of one or more parts of the second part of the object based on the subsets of the group of points.

Herein, the computing device 102 can perform object detection on the third group of point cloud frames using various object detection methods, and determine the group of points associated with the second part of the object and the subsets of the group of points (i.e., the third subset and the fourth subset) from each frame of the third group of point cloud frames.

In step S309, based on the third subset and the fourth subset, a third confidence that the second part includes a third part associated with the third subset and a fourth confidence that the second part includes a fourth part associated with the fourth subset are determined.

In the meantime or after determining the group of points associated with the second part of the object in the surroundings from the third group of point cloud frames and determining the subsets of the group of points (e.g., the third subset and the fourth subset), the computing device 102 may determine confidences for the third subset and the fourth subset (i.e., the third confidence corresponding to the third subset and the fourth confidence corresponding to the fourth subset).

In step S310, a determination is made as to whether to further change the hierarchical representation of the object based on the third confidence and the fourth confidence. The computing device 102 determines whether to further change the hierarchical representation of the object based on the third confidence corresponding to the third subset (i.e., the confidence that the second part of the object includes the third part associated with the third subset) and the fourth confidence corresponding to the fourth subset (i.e., the confidence that the second part of the object includes the fourth part associated with the fourth subset). For example, the computing device 102 determines whether to change the hierarchical representation of the object by determining the relationship between the third and fourth confidences and the predetermined threshold. The third confidence and the fourth confidence being both low (for example, lower than the predetermined threshold) indicates that the detection result is inaccurate and to be discarded. If at least one of the third confidence and the fourth confidence is greater than or equal to the predetermined threshold, a determination is made to change the hierarchical representation of the object.

In some embodiments, a fourth representation of the third part of the object and a fifth representation of the fourth part of the object are generated based on the third subset and the fourth subset in response to the third confidence and the fourth confidence both being greater than or equal to the predetermined threshold. At the same time, the hierarchical representation of the object is changed to further include the fourth representation of the third part and the fifth representation of the fourth part. In some embodiments, the computing device 102 adjusts at least one of the first representation of the object, the second representation of the first part of the object, and the third representation of the second part of the object based on the third group of point cloud frames in response to both the third confidence and the fourth confidence being greater than or equal to the predetermined threshold.

Figure 4B:
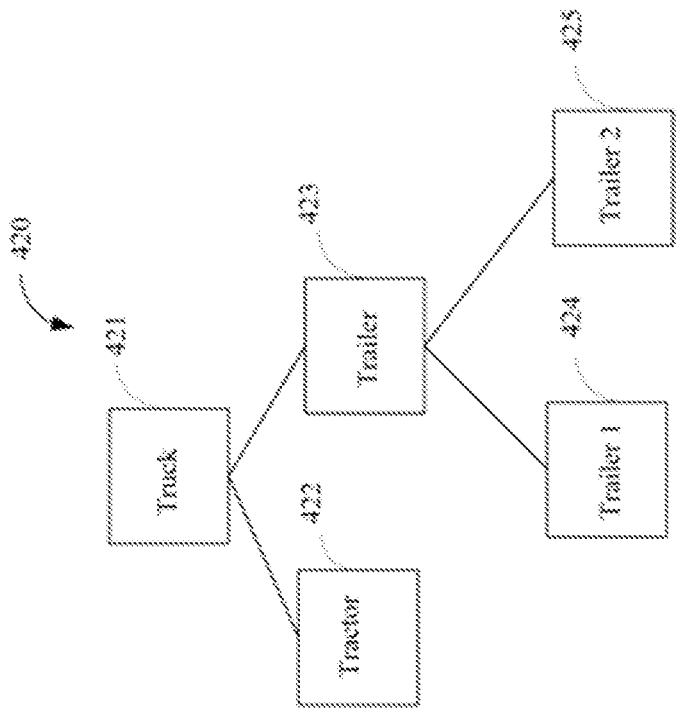
FIG. 4b is a tree diagram of a hierarchical representation of an object according to an embodiment of the present disclosure.

Determining that both the third confidence and the fourth confidence are greater than or equal to the predetermined threshold indicates that the perception system 101 clearly observes that the articulated object includes at least three parts. FIG. 4b shows the hierarchical representation of the object at this point, including the representation of the object as a whole, and representations of the parts (the first part of the object, the second part of the object, the third part of the object, and the fourth part of the object) of the object observed. Alternatively, the second part of the object includes the fourth representation of the third part and the fifth representation of the fourth part included by the second part of the object are at least partially within the third representation of the second part of the object.

In the example of FIG. 1a, if the third group of point cloud frames is acquired by the perception system 101 at t3 of FIG. 1a, then the third part associated with the third subset and the fourth part associated with the fourth subset correspond to different trailers of the truck 112, respectively. In this case, the perception system 101 can clearly observe each trailer, hence the third confidence and the fourth confidence are both greater than or equal to the predetermined threshold.

The observation of the truck 112 by the perception system 101 becomes increasingly clear from t2 to t3 in FIG. 1a, and therefore, if the third group of point cloud frames is acquired by the perception system 101 before t3 and after t2 of FIG. 1a, then the closer to t3 is the moment at which the third group of point cloud frames is acquired, the greater are the third confidence and the fourth confidence; the closer to t2 is the moment, the smaller are the third confidence and the fourth confidence.

Alternatively, in response to both the third confidence and the fourth confidence being less than the predetermined threshold, the detection result is determined to be inaccurate, the detection result is discarded, and the hierarchical representation of the object is kept unchanged.

Alternatively, the representation of the object is adjusted (e.g., at least one of the size and the shape of the third representation of the object is changed) in response to one of the third confidence and the fourth confidence being less than the predetermined threshold and the other being greater than or equal to the predetermined threshold. For example, upon determining that the third confidence is greater than or equal to the predetermined threshold and the fourth confidence is less than the predetermined threshold, the fourth representation of the third part of the object is generated based on the third subset while at least one of the size and the shape of the third representation is changed so that the third representation is the same as the fourth representation of the third part of the object.

It is to be noted that if the second part of the object includes more parts than the third part and the fourth part, and the process described above may also be applied to these parts to generate corresponding representations, and the description thereof will not be repeated here. Furthermore, if the first part of the object may also include different parts, the same process described above may also be applied to generate corresponding representations.

In this embodiment, the method for modeling an object includes: obtaining a first group of point cloud frames associated with surroundings acquired by a perception system; generating a hierarchical representation of an object in the surroundings based on the first group of point cloud frames, the hierarchical representation including a first representation of the object; obtaining a second group of point cloud frames associated with the surroundings acquired by the perception system; determining, from each frame of point cloud in the second group of point cloud frames, a group of points associated with the object and a first subset and a second subset of the group of points; determining, based on the first subset and the second subset, a first confidence that the object includes a first part associated with the first subset and a second confidence that the object includes a second part associated with the second subset; and determining whether to change the hierarchical representation of the object based on the first confidence and the second confidence. This embodiment makes it possible to firstly generate a hierarchical representation of an object based on a first group of point cloud frames, and then determine whether to adjust or refine the hierarchical representation of the object based on a group of points associated with the object and first and second subsets of the group of points in a second group of point cloud frames acquired subsequently, as well as corresponding confidences. As such, the representation of the object is dynamically optimized according to the observation so that the representation of the object is more accurate and stable with the observation, and then the movement state of the object may be accurately determined.

Figure 4A:
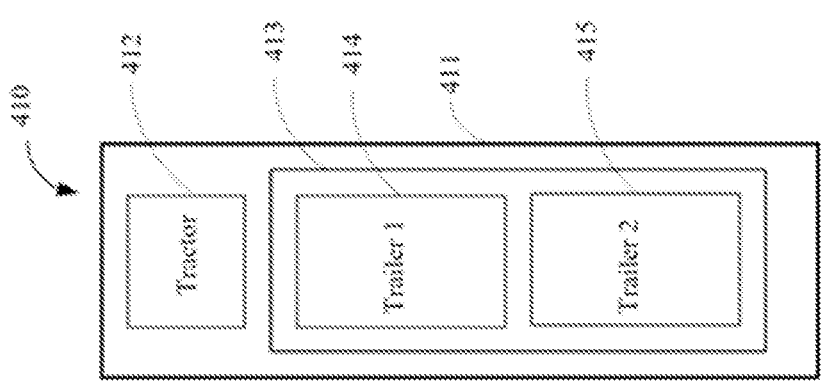
FIG. 4a is a hierarchical representation of an object according to an embodiment of the present disclosure.

FIG. 4a shows an example of the hierarchical representation (e.g., the hierarchical representation 103c described above with reference to FIG. 1b or the hierarchical representation generated with reference to FIG. 3) of the object (e.g., an articulated object such as the truck) generated using the sensor data acquired by the perception system (e.g., the perception system 101 of the vehicle 100) according to an exemplary embodiment of the present disclosure.

As shown in FIG. 4a, the hierarchical representation 410 of the truck includes a bounding box 411. The bounding box 411 is determined based on the group of points associated with the truck in the first group of point cloud frames. The shape and the size of the bounding box 411 correspond to the shape and the size of the truck as a whole. That is, the shape and the size of the bounding box 411 approximate the shape and the size of the truck.

The hierarchical representation of the truck also includes a bounding box 412. The bounding box 412 is determined based on a subset of the group of points associated with the truck in the second group of point cloud frames acquired at another time (i.e., the group of points associated with the tractor in the second group of point cloud frames acquired at another time). The shape and the size of the bounding box 412 correspond to the shape and the size of the tractor. That is, the shape and the size of the bounding box 412 approximate the shape and the size of the tractor.

The hierarchical representation of the truck also includes a bounding box 413. The bounding box 413 is determined based on a subset of the group of points associated with the truck in the second group of point cloud frames (i.e., the group of points associated with the trailer in the second group of point cloud frames). The shape and the size of the bounding box 413 correspond to the shape and the size of the trailer. That is, the shape and the size of the bounding box 413 approximate the shape and the size of the trailer. In FIG. 4a, the bounding box 412 and the bounding box 413 are located entirely within the bounding box 411.

Where the truck includes a plurality of trailers (e.g., the trailer 1 and the trailer 2), the hierarchical representation of the truck also includes bounding boxes 414 and 415. The bounding boxes 414 and 415 are determined based on the subsets of the group of points associated with the trailer in the third group of point cloud frames captured at yet another time (i.e., the points associated with the trailer 1 in the third group of point cloud frames and the points associated with the trailer 2 in the third group of point cloud frames). The shape and the size of the bounding boxes 414 and 415 correspond to the shape and the size of the trailer 1 and the trailer 2, respectively. That is, the shape and the size of the bounding boxes 414 and 415 approximate the shape and the size of the trailer 1 and the trailer 2. In FIG. 4a, the bounding boxes 414 and 415 are located entirely within the bounding box 413.

FIG. 4b is a tree 420 of the hierarchical representation of an articulated object, such as a truck. As shown in FIG. 4b, a first level of the tree graph 420 includes a node 421, which corresponds to a representation of the truck as a whole, such as the bounding box 411 in FIG. 4a. That is, the representation of the truck as a whole is at the first level of the hierarchical representation of the truck. A second level of the tree 420 includes nodes 422 and 423, which correspond respectively to a representation of the tractor and a representation of the trailers as a whole, e.g., the bounding boxes 412 and 413 in FIG. 4a. That is, the representation of the tractor and the representation of the trailers as a whole are at the second level of the hierarchical representation of the truck. Nodes 424 and 425 at a third level of the tree 420 correspond to representations of different trailers (e.g., the trailer 1 and the trailer 2), such as the bounding boxes 414 and 415 in FIG. 4a, respectively. That is, the representations of the trailers 1 and 2 are at the third level of the hierarchical representation of the truck. If a truck includes a tractor and two trailers, such as the trailer 1 and the trailer 2, and is located near the vehicle 100, when the perception system 101 of the vehicle 100 is able to observe the tractor and two trailers of the truck, the computing device 102 of the vehicle 100 generates a hierarchical representation for the truck as shown in FIG. 4b, which includes three levels. The computing device 102 of the vehicle 100 generates the hierarchical representation for the truck, including two levels, namely, the first level and the second level, when the truck is not completely observable by the perception system 101 of the vehicle, for example, only the tractor and one trailer of the truck can be observed. The computing device 102 of the vehicle 100 generates the hierarchical representation for the truck, including only one level, namely, the first level, when the truck is not completely observable by the perception system 101 of the vehicle, for example, only the tractor of the truck can be observed.

Figure 5:
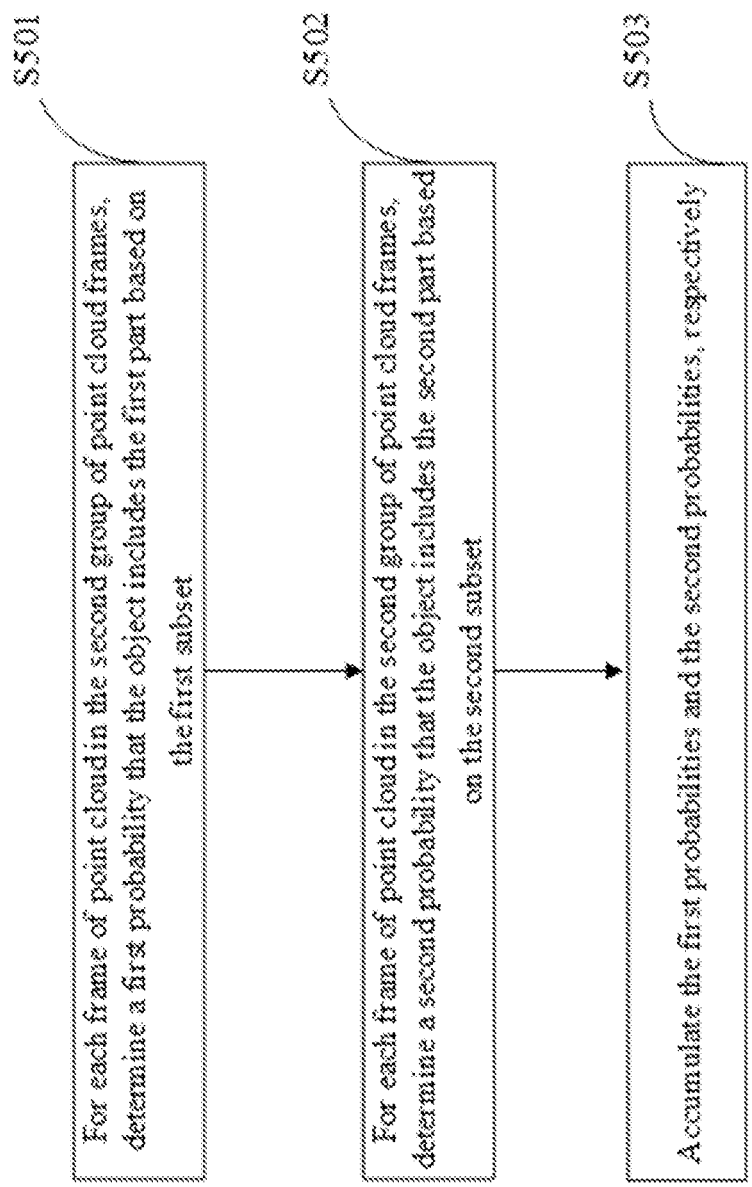
FIG. 5 is an exemplary process for implementing a step of FIG. 2 according to an exemplary embodiment of the present disclosure.

FIG. 5 is a process for implementing step S205 of FIG. 2 (and step S305 of FIG. 3) according to an exemplary embodiment of the present disclosure. The first confidence that the object includes the first part associated with the first subset and the second confidence that the object includes the second part associated with the second subset are determined based on the first subset and the second subset. The process shown in FIG. 5 is implemented by any electronic device, such as the computing device 102 shown in FIG. 1b.

As shown in FIG. 5, in step 501, for each frame of point cloud in the second group of point cloud frames, a first probability that the object includes the first part is determined based on the first subset.

In step 502, for each frame of point cloud in the second group of point cloud frames, a second probability that the object includes the second part is determined based on the second subset.

In step 503, the first probabilities of a plurality of frames of point clouds in the second group of point cloud frames are accumulated, and the second probabilities of a plurality of frames of point clouds in the second group of point cloud frames are accumulated.

For the first subset of each frame in the second group of point cloud frames, a probability that the object includes the first part is determined and denoted as a first probability, the first probabilities corresponding to all the frames in the second group of point cloud frames may be accumulated, and a result thereof is determined as the first confidence that the object includes the first part associated with the first subset. Likewise, for the second subset of each frame in the second group of point cloud frames, a probability that the object includes the second part is determined and denoted as a second probability, the second probabilities corresponding to all the frames in the second group of point cloud frames may be accumulated, and the result thereof is determined as the second confidence that the object includes the second part associated with the second subset.

Figure 6:
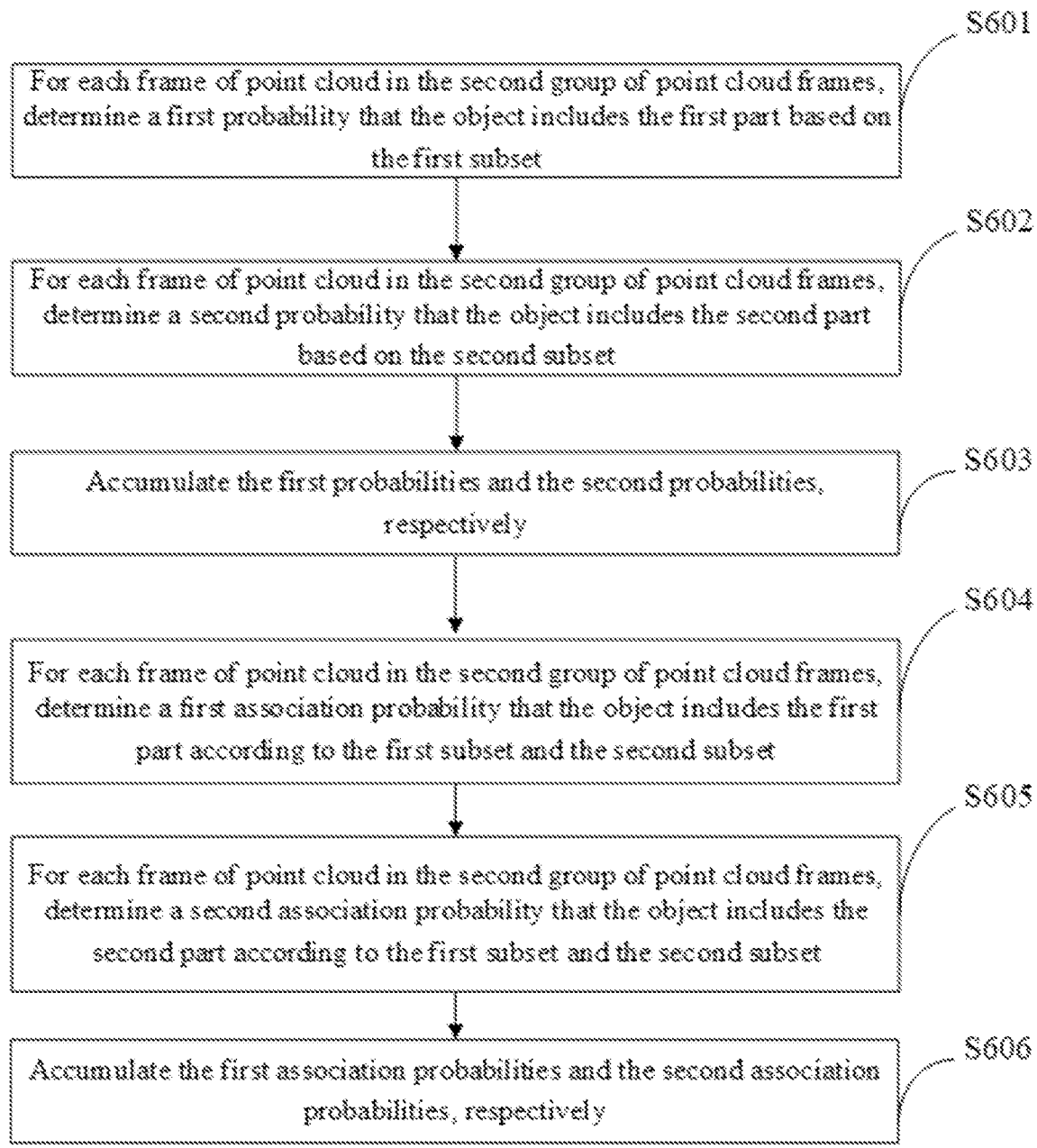
FIG. 6 is another exemplary process for implementing a step of FIG. 2 according to an exemplary embodiment of the present disclosure.

FIG. 6 is a process for implementing step S205 of FIG. 2 (and step S305 of FIG. 3) according to another exemplary embodiment of the present disclosure. The first confidence that the object includes the first part associated with the first subset and the second confidence that the object includes the second part associated with the second subset are determined based on the first subset and the second subset. The process shown in FIG. 6 is implemented by any electronic device, such as the computing device 102 shown in FIG. 1b. Steps S601 to S603 in FIG. 6 are the same as steps S501 to S503 in FIG. 5, and therefore, these steps will not be described in detail below. As shown in FIG. 6, in step 601, for each frame of point cloud in the second group of point cloud frames, a first probability that the object includes the first part is determined based on the first subset. In step 602, for each frame of point cloud in the second group of point cloud frames, a second probability that the object includes the second part is determined based on the second subset. In step 603, the first probabilities of a plurality of frames of point clouds in the second group of point cloud frames are accumulated, and the second probabilities of a plurality of frames of point clouds in the second group of point cloud frames are accumulated.

As shown in FIG. 6, in step 604, for each frame of point cloud in the second group of point cloud frames, a first association probability that the object includes the first part is determined according to the first subset and the second subset.

In step 605, for each frame of point cloud in the second group of point cloud frames, a second association probability that the object includes the second part is determined according to the first subset and the second subset.

In step 606, the first association probabilities of a plurality of frames of point cloud in the second group of point cloud frames are accumulated, and the second association probabilities of a plurality of frames of point cloud in the second group of point cloud frames are accumulated.

Where the group of points associated with the object includes the first subset and the second subset, any point in the group of points associated with the object belongs to either the first subset or the second subset. That is, the probability that any point in the group of points associated with the object belongs to the first subset is subjected not only to the first subset but also to the second subset, and the probability that any point in the group of points associated with the object belongs to the second subset is subjected not only to the second subset but also to the first subset. Therefore, for each frame of point cloud in the second group of point cloud frames, the first association probability that the object includes the first part may be determined according to the first subset and the second subset, and the first association probabilities corresponding to all the frames of point clouds in the second group of point cloud frames may be accumulated, and a result obtained by multiplying the same with the accumulated first probabilities is determined as the first confidence that the object includes the first part associated with the first subset. Likewise, the second association probability that the object includes the second part may be determined based on the first subset and the second subset, the second association probabilities corresponding to all the frames of point clouds in the second group of point cloud frames may be accumulated, and a result obtained by multiplying the same with the accumulated second probabilities is determined as the second confidence that the object includes the second part associated with the second subset.

In an alternative embodiment, the first association probabilities of all the frames of point clouds in the second group of point cloud frames may be accumulated, and a result therefrom is determined as the first confidence that the object includes the first part associated with the first subset. The second association probabilities for all the frames of point clouds in the second group of point cloud frames may be accumulated, and a result therefrom is determined as the second confidence that the object includes the second part associated with the second subset.

In some embodiments, a sensor (e.g., the LiDAR) is pre-employed to obtain one or more frames of point clouds associated with particular surroundings, and for each frame of point cloud, a group of points associated with an articulated object in the surroundings is labeled (e.g., manually labeled), with the first subset of the group of points corresponding to the first part of the articulated object and the second subset of the group of points corresponding to the second part of the articulated object being labeled, too. These frames of point clouds and the labeled results are stored as a data set. After this, for each frame of point cloud, a distance between the object (namely, the articulated object) in the surroundings and the LiDAR when acquiring the point cloud is determined. The method described above in the present disclosure is taken to determine the group of points associated with the object in the surroundings in the data set and the first subset and the second subset of the group of points, determine the first probability that the object includes the first part based on the first subset, determine the second probability that the object includes the second part based on the second subset. The labeled results may be used to determine an accuracy rate corresponding to each first probability and each second probability. Thus, for each frame of point cloud, the derived accuracy rate and the distance between the object and the LiDAR when acquiring the point cloud are stored correspondingly in the data set.

To determine a respective accuracy rate respectively with regard to the first probability and the second probability corresponding to each frame of point cloud in the second group of point cloud frames, a distance between the object and the perception system may be firstly determined based on the frame of point cloud in the second group of point cloud frames, and an accuracy rate corresponding to a distance which is the same as the above mentioned distance (or a distance with a minimum difference therebetween) is selected from the stored data set as the accuracy rate of the first probability and the second probability corresponding to the frame of point cloud in the second group of point cloud frames. Accordingly, the processes of FIGS. 5 and 6 may further include: prior to accumulating the first probabilities and the second probabilities in step S503 or step S603, determining the accuracy rate corresponding to the first probability and the second probability for each frame of point cloud in the second group of point cloud frames based on the pre-stored data set. In this case, accumulating the first probabilities and the second probabilities in step S503 or step S603 includes:

- modifying each of the first probabilities with a corresponding accuracy rate,
- modifying each of the second probabilities with a corresponding accuracy rate, and
- accumulating the modified first probabilities and the modified second probabilities corresponding to a plurality of frames of point cloud in the second group of point cloud frames.

While performing accumulating operation, the first probabilities of all the frames of point clouds in the second group of point cloud frames are multiplied by the accuracy rates corresponding to the first probabilities, and a result therefrom (or multiplying the result by the accumulated first association probabilities) is determined as the first confidence that the object includes the first part associated with the first subset. While performing accumulating operation, the second probabilities of all the frames of point clouds in the second group of point cloud frames are also multiplied by the accuracy rates corresponding to the second probabilities, and a result (or multiplying the result by the accumulated second association probabilities) is determined as the second confidence that the object includes the second part associated with the second subset.

Considering the accuracy rate, the following equations may be taken to determine the confidence of any part of the object:

$$P(y_i = T \mid X) = \frac{1}{Z} \prod_t \Psi(y_i = T, x_i^t)$$

where $P(y_i=T|X)$ is a confidence that an i-th part of the object exists for a given group of point cloud frames X (i.e., $y_i$=True), the group of point cloud frames X includes point cloud frames at t time points, and Z is a normalization constant (for setting the result to be between 0 and 1); Π denotes accumulation (for the t time points herein);

$$\Psi(y_i=T,x_i^t)=p(y_i|x_i^t)=p_1(y_i=T|x_i^t)p_2(y_i=T|x_i^t)$$

where $p(y_i|x_i^t)$ represents the probability of the existence of the i-th part of the object, $p_1(y_i=T|x_i^t)$ represents the probability of predicting the existence of the i-th part of the object based on the point cloud frames X (which may be the confidence of the i-th part of the object being recognized by the model), and $p_2(y_i=T|x_i^t)$ represents the accuracy of predicting the existence of the i-th part of the object based on the pre-stored data set (which may be the accuracy of the model); alternatively, for $p_2(y_i=T|x_i^t)$, the distance between the object and the perception system may be firstly determined for each frame of point cloud in the group of point cloud frames X, and the accuracy rate (i.e., the accuracy rate for predicting the existence of the i-th part of the object) at the distance (or a distance with a smallest difference from it) is selected from the pre-stored data set.

Alternatively, considering the accuracy rate, the confidence of any part of the object may be determined using the following equation:

$$P(y_i=T \mid X) = \frac{1}{Z} \prod_t \Psi(y_i=T, x_i^t) \prod_{i \neq j, t} \Psi(y_i=T, x_i^t, x_j^t)$$

where those preceding $\Psi(y_i=T, x_i^t, x_j^t)$ are described above, and the following focuses on $\Psi(y_i=T, x_i^t, x_j^t)$.

$$\Psi(y_i=T, x_i^t, x_j^t)=p(y_i=T|x_i^t,x_j^t)$$

where $p(y_i=T|x_i^t,x_j^t)$ represents an association probability that the i-th part of the object exists when the i-th part and a j-th part of the object are simultaneously recognized in the point cloud frame. The association probability may be calculated from the point cloud frames X To simplify the calculation, the association probability may also be calculated based on point cloud frames in the pre-stored data set. For example, with regard to $p(y_i=T|x_i^t,x_j^t)$, the distance between the object and the perception system may be determined firstly for each frame of point cloud in the group of point cloud frames X, and the association probability (i.e., the predicted association probability that the i-th part of the object exists when the i-th part and the j-th part of the object are recognized simultaneously) at the distance (or a distance with the minimum difference from it) is selected from the pre-stored data set.

It is to be noted that the above equations may be applied to determine, based on the first subset and the second subset, the first confidence that the object includes the first part associated with the first subset and the second confidence that the object includes the second part associated with the second subset, and to determine the confidences that the second part includes the third part and the fourth part.

Figure 7:
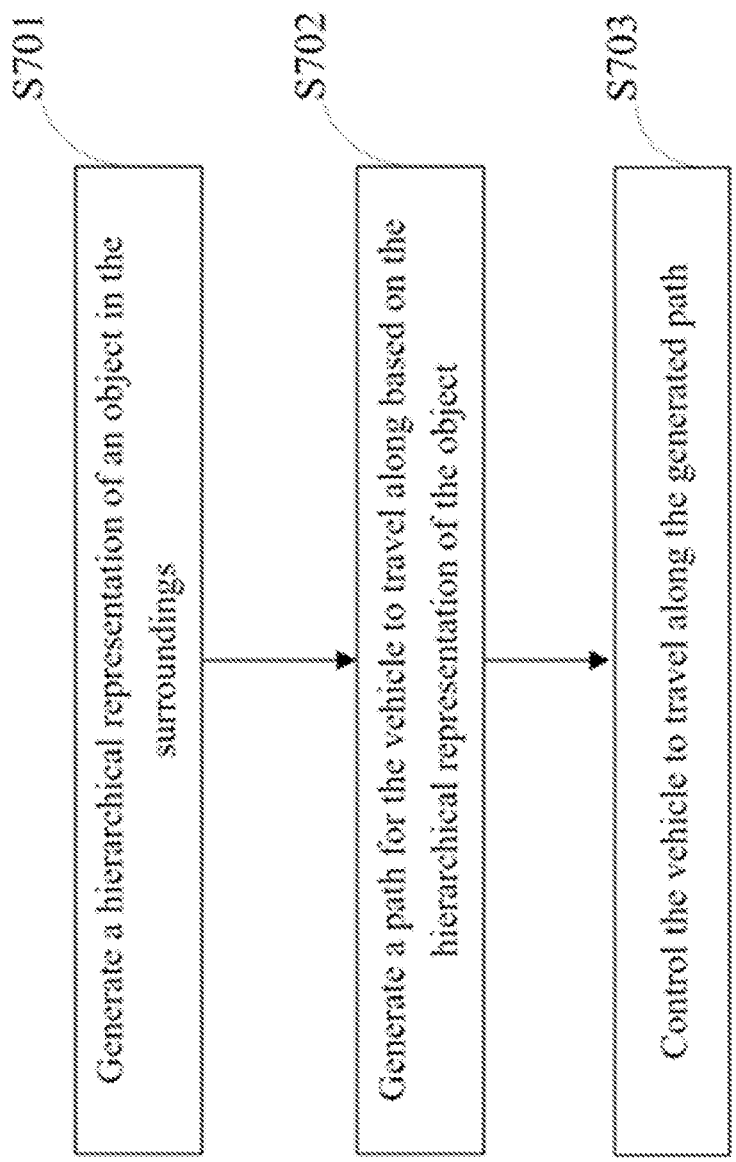
FIG. 7 is a flowchart of a vehicle control method according to an embodiment of the present disclosure.

FIG. 7 shows a flowchart of a vehicle control method, for example, for controlling the vehicle 100 of FIGS. 1a and 1b. The method may be performed, for example, by the computing device 102 of FIG. 1b.

In step S701, the computing device 102 generates the hierarchical representation of the object in the surroundings of the vehicle 100. The computing device 102 on the vehicle 100 may generate the hierarchical representation of the object in the surroundings of the vehicle 100 based on the data (e.g., point clouds and/or images) associated with the surroundings acquired by the perception system 101. The hierarchical representation of the object may be generated based on any of the methods described above, such as the methods illustrated in FIGS. 2 and 3. Thus, in some embodiments, step S701 includes steps S201 to S206 in FIG. 2, and in some embodiments, step S701 includes steps S301 to S310 in FIG. 3. The computing device 102 provides the hierarchical representation unchanged or changed in step S206 or step S310 to step S702.

In step S702, the computing device 102 generates the path (or trajectory) for the vehicle to travel along at least partly based on the hierarchical representation of the object. The computing device 102 may utilize the hierarchical representation of the object (e.g., the hierarchical representation unchanged or changed in step S206 or step S310) and combine data from the perception system 101, such as GPS transceiver data, RADAR data, LiDAR data, camera data, and/or data from other vehicle systems to determine the path or trajectory of the vehicle 100.

In step S703, the computing device 102 controls the vehicle to travel along the generated path (or trajectory). The computing device 102 may generate and send control instructions to the control system of vehicle 100 for controlling the operation of vehicle 100 and components (or units) thereof so that the vehicle travels along the path (or trajectory) generated in step 702. The control system of the vehicle may include various units, such as a steering unit, a power control unit, and a braking unit.

The methods described in FIGS. 2 and 3 of the present disclosure may be implemented through various object detection methods, such as a BEV (bird's eye view)-based object detection method and a frustum-based object detection method.

The BEV-based object detection method is described below by taking a PointPillars algorithm model (hereinafter referred to as PointPillars) as an example in conjunction with FIG. 8. Those skilled in the art will appreciate that the BEV-based object detection method may be implemented using other neural network or algorithm models other than PointPillars.

The conventional PointPillars network architecture includes an input network, a feature extraction network, a detection head, and an output network. FIG. 8 shows a PointPillars network architecture according to the present disclosure. As shown in FIG. 8, the PointPillars network architecture of the present disclosure additionally includes detection heads, e.g., a detection head 804 and a detection head 805, that perform region-of-interest pooling (abbreviated as ROI pooling) with respect to the conventional network architecture. It will be appreciated by those skilled in the art that while FIG. 8 illustrates two detection heads performing ROI pooling, the PointPillars network architecture may include more or fewer detection heads performing ROI pooling.

Figure 8:
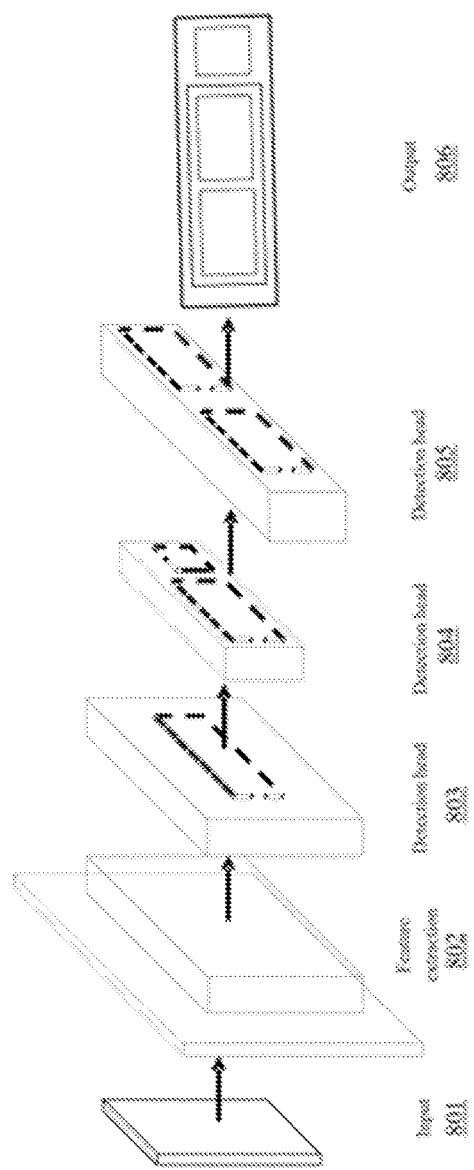
FIG. 8 is a schematic diagram of a BEV-based object detection method according to an embodiment of the present disclosure.

As shown in FIG. 8, an input network 801 may receive a point cloud, such as the point cloud acquired by the LiDAR of the perception system 101 of FIG. 1b, and pass the received point cloud to a feature extraction network 802. The feature extraction network 802 may segment the point cloud received from the input network 801 into a plurality of Pillar units to convert the point cloud into a pseudo-image and extract features from the pseudo-image using a convolutional neural network. The detection head 803 performs object detection according to the features extracted by the feature extraction network 802 so as to determine the group of points associated with the object in the surroundings of the vehicle (e.g., the vehicle 100) from the point cloud, generates the representation (e.g., a bounding box) of the object accordingly, and generates a confidence (i.e., a confidence of the existence of the object) corresponding to the group of points. The detection head 804 then performs the ROI pooling on the group of points, determines a plurality of subsets (e.g., the first subset and the second subset) of the group of points to predict a plurality of parts of the object, such as the first part associated with the first subset and the second part associated with the second subset, and generates bounding boxes for the first part and the second part and confidences corresponding to the first part and the second part (i.e., a confidence that the object includes the first part and a confidence that the object includes the second part). The detection head 805 then performs the ROI pooling on at least one subset (e.g., the second subset) of the plurality of subsets as determined by the detection head 804, determines a plurality of subsets (e.g., the third subset and the fourth subset) of the second subset to predict a plurality of parts of the second part of the object, such as the third part associated with the third subset and the fourth part associated with the fourth subset, and generates bounding boxes for the third part and the fourth part and confidences corresponding to the third part and the fourth part (i.e., a confidence that the object includes the third part and a confidence that the object includes the fourth part). An output network 806 outputs a hierarchical representation of the object composed of bounding boxes based on the above mentioned confidences.

In some embodiments, the detection head 803, after performing object detection, determines the type of the detected object, and if the detected object is an articulated object, the detection head 803 provides its detection result to the detection head 804 for ROI pooling. If the detected object is not an articulated object, the detection result is not provided to the detection head 804, but is directly provided to the output network 806 for output.

Figure 9:
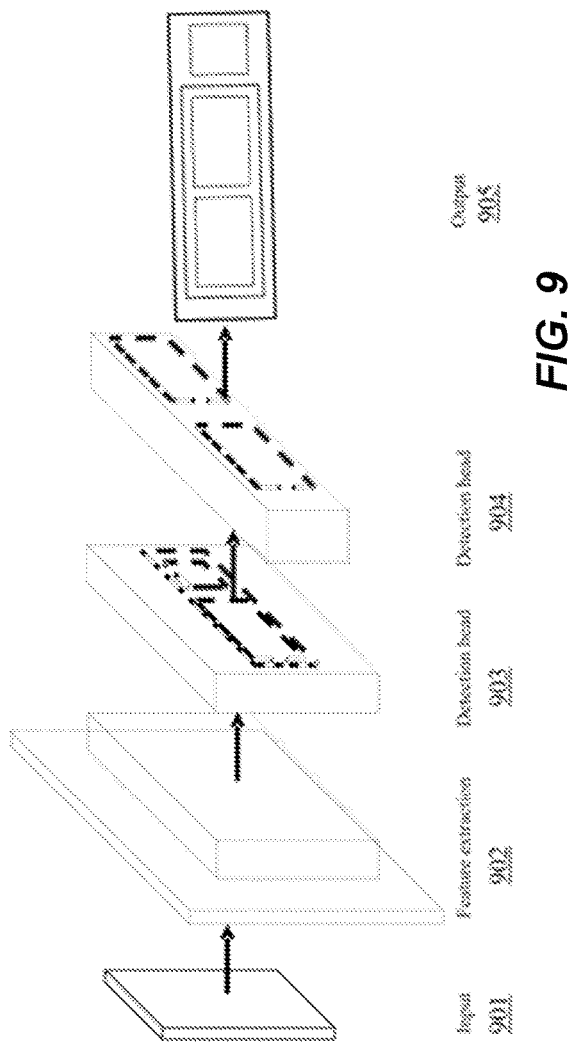
FIG. 9 is a schematic diagram of a frustum-based object detection method according to an embodiment of the present disclosure.

The frustum-based object detection method is described in detail below in conjunction with FIG. 9. The network architecture of conventional frustum-based object detection methods includes an input network, a feature extraction network, a detection head, and an output network. FIG. 9 illustrates a network architecture of the frustum-based object detection method according to the present disclosure. The network architecture of the present disclosure improves detection heads upon conventional network architecture by, on the one hand, splitting a detection head (e.g., a detection head 903 of FIG. 9) into multiple branches and, on the other hand, adding a detection head (e.g., a detection head 904 of FIG. 9).

As described above, the LiDAR and the camera in the perception system 101 (see FIG. 1b) may have overlapping fields of view, and the frustum-based object detection method takes advantage of the feature that the LiDAR and the camera have overlapping fields of view to combine the image acquired by the camera and the point cloud acquired by the LiDAR for object detection.

As shown in FIG. 9, the input network 901 may receive point clouds and images, such as the point cloud acquired by the LiDAR of the perception system 101 and the image acquired by the camera of the perception system 101. The input network 901 detects the bounding box of the object in the image and then, with the camera as an origin, extends in a direction to the bounding box, forming a frustum. The input network 901 determines which points in the point cloud locate within this frustum based on the relative pose of the camera and the LiDAR.

A feature extraction network 902 may extract features from the points within the frustum as determined by the input network 901. An example of the feature extraction network 902 is a PointNet network. The detection head 903 performs object detection based on features extracted by the feature extraction network 902, and the detection head 903 includes multiple (e.g., three) branches. A branch determines the group of points associated with the object in the surroundings of a vehicle (e.g., the vehicle 100) from the point cloud, generates the representation (e.g., a bounding box) of the object, and generates a confidence (i.e., a confidence of the existence of the object) corresponding to the group of points. The other branches of the detection head 903 determine a plurality of subsets of the group of points (e.g., the first subset and the second subset, with each branch determining one subset) to predict a plurality of parts of the object, e.g., the first part associated with the first subset and the second part associated with the second subset (with each branch predicting one part), and generate bounding boxes for the first part and the second part and confidences for the first part and the second part (i.e., a confidence that the object includes the first part and a confidence that the object includes the second part). The detection head 904 determines a plurality of subsets (e.g., the third subset and the fourth subset) for at least one subset of the plurality of subsets as determined by the detection head 903, such as the second subset, to predict a plurality of parts of the second part of the object, such as the third part associated with the third subset and the fourth part associated with the fourth subset, and generates bounding boxes for the third part and the fourth part and confidences corresponding to the third part and the fourth part (i.e., a confidence that the object includes the third part and a confidence that the object includes the fourth part). The output network 905 outputs the hierarchical representation of the object composed of the bounding boxes based on the above mentioned confidences.

Figure 10:
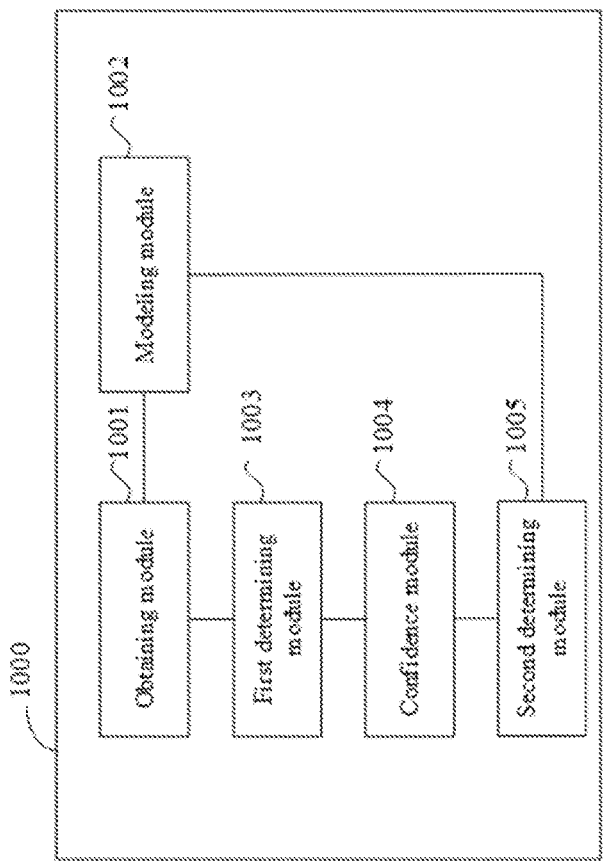
FIG. 10 is a block diagram of an apparatus for modeling an object according to an embodiment of the present disclosure.

FIG. 10 is a block diagram of an apparatus for modeling an object according to an embodiment of the present disclosure. The apparatus for modeling an object according to the present embodiment is provided in any electronic device and may execute a process according to an embodiment of the method for modeling an object. As shown in FIG. 10, the apparatus for modeling an object 1000 includes: an obtaining module 1001, a modeling module 1002, a determining module 1003, a confidence module 1004.

The obtaining module 1001 is configured to obtain a first group of point cloud frames acquired by a perception system associated with surroundings.

The modeling module 1002 is configured to generate a hierarchical representation of the object in the surroundings based on the first group of point cloud frames, wherein the hierarchical representation includes a first representation of the object.

The obtaining module 1001 is further configured to obtain a second group of point cloud frames associated with the surroundings acquired by the perception system.

A first determining module 1003 is configured to determine, from each frame of point cloud in the second group of point cloud frames, a group of points associated with the object and a first subset and a second subset of the group of points.

The confidence module 1004 is configured to determine, based on the first subset and the second subset, a first confidence that the object includes a first part associated with the first subset and a second confidence that the object includes a second part associated with the second subset.

A second determining module 1005 is configured to determine whether to change the hierarchical representation of the object based on the first confidence and the second confidence.

In one or more embodiments of the present disclosure, the modeling module 1002 is further configured to:
keep the hierarchical representation unchanged in response to both the first confidence and the second confidence being less than a predetermined threshold.

In one or more embodiments of the present disclosure, the modeling module 1002 is further configured to:
change the hierarchical representation in response to at least one of the first confidence and the second confidence being greater than or equal to the predetermined threshold.

In one or more embodiments of the present disclosure, the modeling module 1002 is further configured to:
change at least one of a size and a shape of the first representation in response to one of the first confidence and the second confidence being less than the predetermined threshold and another being greater than or equal to the predetermined threshold,
generate a second representation of the first part of the object and a third representation of the second part of the object in response to both the first confidence and the second confidence being greater than or equal to the predetermined threshold, and
change the hierarchical representation to further include the second representation of the first part and the third representation of the second part, wherein the second and third representations is at least partially within the first representation.

In one or more embodiments of the present disclosure, the confidence module 1004, when determining, based on the first subset and the second subset, the first confidence that the object includes the first part associated with the first subset and the second confidence that the object includes the second part associated with the second subset, is configured to:
for each frame of point cloud in the second group of point cloud frames, determine a first probability that the object includes the first part based on the first subset,
for each frame of point cloud in the second group of point cloud frames, determine a second probability that the object includes the second part based on the second subset, and
accumulate the plurality of first probabilities and the plurality of second probabilities, respectively.

In one or more embodiments of the present disclosure, the confidence module 1004, when determining, based on the first subset and the second subset, the first confidence that the object includes the first part associated with the first subset and the second confidence that the object includes the second part associated with the second subset, is further configured to:
for each frame of point cloud in the second group of point cloud frames, determine a first association probability that the object includes the first part according to the first subset and the second subset,
for each frame of point cloud in the second group of point cloud frames, determine a second association probability that the object includes the second part according to the first subset and the second subset, and
accumulate the plurality of first association probabilities and the plurality of second association probabilities, respectively.

In one or more embodiments of the present disclosure, the confidence module 1004, when determining, based on the first subset and the second subset, the first confidence that the object includes the first part associated with the first subset and the second confidence that the object includes the second part associated with the second subset, is further functions to:
determine, based on pre-stored data sets, an accuracy rate for the first probability and the second probability, respectively, corresponding to each frame of point cloud in the second group of point cloud frames.

In one or more embodiments of the present disclosure, the obtaining module 1001 is further configured to obtain a third group of point cloud frames associated with the surroundings acquired by the perception system.

The determining module 1003 is further configured to determine, from each frame of the third group of point cloud frames, a group of points associated with the second part of the object and a third subset and a fourth subset of the group of points.

The confidence module 1004 is further configured to determine, based on the third subset and the fourth subset, a third confidence that the second part includes a third part associated with the third subset and a fourth confidence that the second part includes a fourth part associated with the fourth subset.

In one or more embodiments of the present disclosure, the modeling module 1002 is further configured to generate a representation of a third part of the object and a representation of a fourth part of the object in response to both the third and fourth confidences being greater than or equal to the predetermined threshold.

In one or more embodiments of the present disclosure, the object is a truck, the first part is a tractor of the truck, and the second part is a trailer of the truck.

The apparatus for modeling an object of the embodiment of the present disclosure may be taken to implement the technical solution of the above-mentioned method embodiment, and the apparatus and the method have similar implementation principles and technical effects, which will not be described in detail herein.

Figure 11:
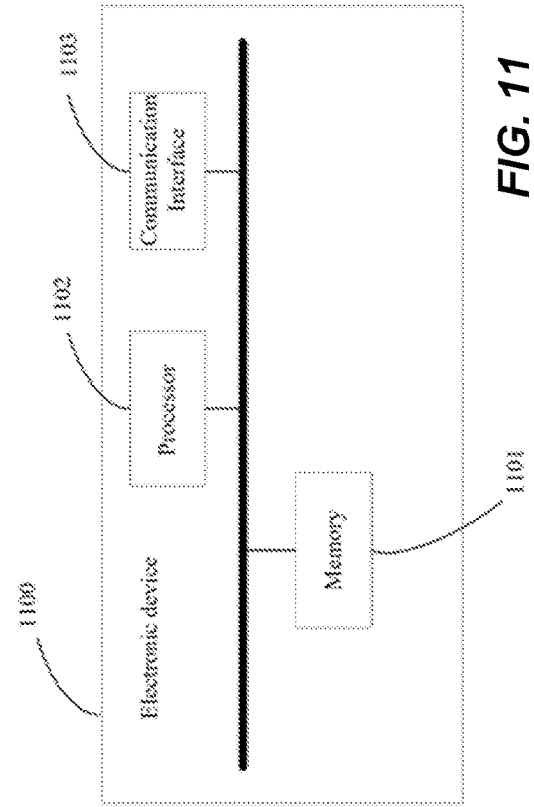
FIG. 11 is a block diagram of an electronic device according to an embodiment of the present disclosure.

FIG. 11 shows a schematic diagram of a hardware structure of an electronic device according to an embodiment of the present disclosure. As shown in FIG. 11, the electronic device 1100 is configured to be a corresponding electronic device (such as the computing device 102 shown in FIG. 1b) in any of the above-mentioned method embodiments, and the electronic device 1100 of the present embodiment may include: a memory 1101, a processor 1102, and a communication interface 1103.

The memory 1101 is configured to store a computer program. The memory 1101 may be a high-speed random-access memory (RAM), and a non-volatile memory (NVM), such as at least one magnetic disk memory, and may also be a USB disk, a removable hard disk, a read-only memory, a magnetic or optical disk, etc.

The processor 1102 is configured to execute the computer program stored in the memory to implement the method in any of the above-mentioned embodiments, and reference can be made to the relevant description in the above-mentioned embodiments of the method. The processor 1102 may be a central processing unit (CPU), other general-purpose processors, a digital signal processor (DSP), an application-specific integrated circuit (ASIC), etc. The general-purpose processor may be a microprocessor, but in the alternative, the processor may be any conventional processor. The steps of the method disclosed in connection with the present disclosure may be embodied directly in a hardware processor for execution, or in a combination of hardware and software modules within the processor for execution.

Alternatively, the memory 1101 may be separate from or integrated with the processor 1102. When the memory 1101 is separate from the processor 1102, the electronic device 1100 may also include a bus. The bus is configured to connect the memory 1101 and the processor 1102. The bus may be an Industry Standard Architecture (ISA) bus, an Peripheral Component Interconnect (PCI) bus, or an Extended Industry Standard Architecture (EISA) bus, etc. The bus may be divided into an address bus, a data bus, a control bus, etc. For ease of illustration, the bus in the figures of the present disclosure is not limited to only one bus or one type of bus.

The communication interface 1103 is configured to receive or transmit various data and/or instructions.

The electronic device provided in the present embodiment may be taken to perform the method in the above-mentioned embodiments in a similar manner and with similar technical effects, which will not be described in detail herein.

In addition, this embodiment further provides a computer-readable storage medium having stored therein a computer program executable by the processor to implement the method according to the embodiments described above.

In addition, this embodiment further provides a computer program product including the computer program executable by the processor to implement the method according to the embodiments described above.

In the examples provided herein, it should be understood that the disclosed apparatus and method may be implemented in other ways. For example, the apparatus embodiments described above are merely illustrative, e.g., the division of elements is merely logical and functional, and in actual implementations, there may be additional divisions, for example, multiple elements or components may be combined or integrated into another system, or some features may be omitted, or not performed. In another aspect, the couplings or direct couplings or communication connections shown or discussed with respect to each other may be indirect couplings or communication connections through some interface, device, or unit, and may be electrical, mechanical, or otherwise.

The elements described as separate components may or may not be physically separated, the components shown as elements may or may not be physical elements, that is, they may be located in one place or distributed over a plurality of network elements. Some or all of the elements may be selected to achieve the object of the embodiments according to actual needs.

In addition, all the functional units in the embodiments of the present disclosure may be integrated in one processing unit, each unit may be physically present separately, or two or more units may be integrated in one unit. The above-mentioned integrated units can be realized in the form of hardware or in the form of hardware-plus-software functional units.

The integrated units described above, implemented in the form of software functional units, may be stored in a computer-readable storage medium. The software functional units described above are stored in a storage medium, including instructions to cause a computer device (a personal computer, a server, or a network device, etc.) or a processor to perform some of the steps of the method as described in various embodiments of the present disclosure. The storage medium includes a USB disk, removable hard disk, read-only memory (ROM), random access memory (RAM), magnetic or optical disk, and other various media that can store the program code.

It can be clearly understood by a person skilled in the art that, for the convenience and brevity of description, only the above division of the functional modules is exemplified, and in practical applications, the above functions may be assigned to different functional modules for implementation according to needs, that is, an internal structure of a device is divided into different functional modules so as to perform all or part of the functions described above. To learn about the specific operation of the apparatus described above, reference may be made to the corresponding process in the foregoing method embodiments, which will not be described in detail herein.

The above-mentioned embodiments are merely illustrative of the technical solutions of the embodiments of the present disclosure, rather than limiting same; although the embodiments of the present disclosure have been described in detail with reference to the foregoing embodiments, those skilled in the art will appreciate that the technical solutions disclosed in the above-mentioned embodiments can still be modified, or some or all of the technical features thereof can be replaced by equivalents; however, these modifications or replacements do not bring the essence of the corresponding technical solutions out of the scope of the technical solutions of the embodiments herein.

Other embodiments of the present disclosure will be apparent to those skilled in the art on the basis of the specification herein and the practice of the present disclosure. This present disclosure is intended to cover any variations, uses, or adaptations thereof following, in general, the principles of the present disclosure and including such departures from the present disclosure as come within the known or customary practice in the art to which the present disclosure pertains. It is intended that the specification and examples be considered as exemplary only, with a true scope and spirit of the application being defined by the appended claims.

It should be understood that the present disclosure is not limited to the precise arrangements described above and shown in the accompanying drawings, and that various modifications and changes may be made without departing from the scope thereof. The scope of the present disclosure is defined only by the appended claims.

What is claimed is:

1. A vehicle control method, comprising:
    obtaining a first group of point cloud frames associated with surroundings of a perception system;
    generating a hierarchical representation of an object in the surroundings based on the first group of point cloud frames, the hierarchical representation comprising a first representation of the object;
    obtaining a second group of point cloud frames associated with the surroundings of the perception system;
    determining, from each frame of point cloud in the second group of point cloud frames, a group of points associated with the object and a first subset and a second subset of the group of points;
    determining, based on the first subset and the second subset, a first confidence that the object comprises a first part associated with the first subset and a second confidence that the object comprises a second part associated with the second subset;
    determining whether to change the hierarchical representation of the object based on the first confidence and the second confidence;

generating a trajectory for the vehicle to travel along at least partly based on the hierarchical representation of the object; and controlling the vehicle to travel along the generated trajectory, wherein determining whether to change the hierarchical representation of the object based on the first confidence and the second confidence comprises:

changing at least one of a size and a shape of the first representation in response to one of the first confidence and the second confidence being less than the predetermined threshold and the other of the first confidence and the second confidence being greater than or equal to the predetermined threshold, wherein generating the trajectory for the vehicle to travel along based on the hierarchical representation of the object comprises:

generating the trajectory for the vehicle to travel along based on the changed hierarchical representation of the object.

2. The method according to claim 1, wherein the second group of point cloud frames comprises a plurality of frames of point clouds, wherein determining, based on the first subset and the second subset, the first confidence that the object comprises the first part associated with the first subset and the second confidence that the object comprises the second part associated with the second subset comprises:

for each frame of point cloud in the second group of point cloud frames, determining a first probability that the object comprises the first part based on the first subset, for each frame of point cloud in the second group of point cloud frames, determining a second probability that the object comprises the second part based on the second subset, and accumulating a plurality of first probabilities and a plurality of second probabilities, respectively.

3. The method according to claim 2, wherein determining, based on the first subset and the second subset, the first confidence that the object comprises the first part associated with the first subset and the second confidence that the object comprises the second part associated with the second subset further comprises:

for each frame of point cloud in the second group of point cloud frames, determining a first association probability that the object comprises the first part according to the first subset and the second subset, for each frame of point cloud in the second group of point cloud frames, determining a second association probability that the object comprises the second part according to the first subset and the second subset, and accumulating the first association probabilities and the second association probabilities, respectively.

4. The method according to claim 2, wherein determining, based on the first subset and the second subset, the first confidence that the object comprises the first part associated with the first subset and the second confidence that the object comprises the second part associated with the second subset further comprises:

determining, based on a pre-stored data set, an accuracy rate for the first probability and the second probability, respectively, for each frame of point cloud in the second group of point cloud frames.

5. The method according to claim 1, wherein the object is a truck, the first part is a tractor of the truck, and the second part is a trailer of the truck.

6. An electronic device, comprising: a processor and a memory, wherein the memory stores program instructions executable by the processor to implement a vehicle control method, comprising:

obtaining a first group of point cloud frames associated with surroundings of a perception system;

generating a hierarchical representation of an object in the surroundings based on the first group of point cloud frames, the hierarchical representation comprising a first representation of the object;

obtaining a second group of point cloud frames associated with the surroundings of the perception system;

determining, from each frame of point cloud in the second group of point cloud frames, a group of points associated with the object and a first subset and a second subset of the group of points;

determining, based on the first subset and the second subset, a first confidence that the object comprises a first part associated with the first subset and a second confidence that the object comprises a second part associated with the second subset;

determining whether to change the hierarchical representation of the object based on the first confidence and the second confidence;

generating a trajectory for the vehicle to travel along at least partly based on the hierarchical representation of the object; and controlling the vehicle to travel along the generated trajectory, wherein determining whether to change the hierarchical representation of the object based on the first confidence and the second confidence comprises:

changing at least one of a size and a shape of the first representation in response to one of the first confidence and the second confidence being less than the predetermined threshold and another being greater than or equal to the predetermined threshold, wherein generating the trajectory for the vehicle to travel along based on the hierarchical representation of the object comprises:

generating the trajectory for the vehicle to travel along based on the changed hierarchical representation of the object.

7. The electronic device according to claim 6, wherein the second group of point cloud frames comprises a plurality of frames of point clouds, wherein determining, based on the first subset and the second subset, the first confidence that the object comprises the first part associated with the first subset and the second confidence that the object comprises the second part associated with the second subset comprises:

for each frame of point cloud in the second group of point cloud frames, determining a first probability that the object comprises the first part based on the first subset, for each frame of point cloud in the second group of point cloud frames, determining a second probability that the object comprises the second part based on the second subset, and accumulating a plurality of first probabilities and a plurality of second probabilities, respectively.

8. The electronic device according to claim 7, wherein determining, based on the first subset and the second subset, the first confidence that the object comprises the first part associated with the first subset and the second confidence that the object comprises the second part associated with the second subset further comprises:

for each frame of point cloud in the second group of point cloud frames, determining a first association probability that the object comprises the first part according to the first subset and the second subset, for each frame of point cloud in the second group of point cloud frames, determining a second association probability that the object comprises the second part according to the first subset and the second subset, and accumulating the first association probabilities and the second association probabilities, respectively.

9. The electronic device according to claim 7, wherein determining, based on the first subset and the second subset, the first confidence that the object comprises the first part associated with the first subset and the second confidence that the object comprises the second part associated with the second subset further comprises:

determining, based on a pre-stored data set, an accuracy rate for the first probability and the second probability, respectively, for each frame of point cloud in the second group of point cloud frames.

10. The electronic device according to claim 6, wherein the object is a truck, the first part is a tractor of the truck, and the second part is a trailer of the truck.

11. A non-transitory computer-readable storage medium, wherein the computer-readable storage medium stores program instructions executable by a processor to implement a vehicle control method, comprising:

obtaining a first group of point cloud frames associated with surroundings of a perception system;

generating a hierarchical representation of an object in the surroundings based on the first group of point cloud frames, the hierarchical representation comprising a first representation of the object;

obtaining a second group of point cloud frames associated with the surroundings of the perception system;

determining, from each frame of point cloud in the second group of point cloud frames, a group of points associated with the object and a first subset and a second subset of the group of points;

determining, based on the first subset and the second subset, a first confidence that the object comprises a first part associated with the first subset and a second confidence that the object comprises a second part associated with the second subset;

determining whether to change the hierarchical representation of the object based on the first confidence and the second confidence;

generating a trajectory for the vehicle to travel along at least partly based on the hierarchical representation of the object; and controlling the vehicle to travel along the generated trajectory, wherein determining whether to change the hierarchical representation of the object based on the first confidence and the second confidence comprises:

changing at least one of a size and a shape of the first representation in response to one of the first confidence and the second confidence being less than the predetermined threshold and another being greater than or equal to the predetermined threshold, wherein generating the trajectory for the vehicle to travel along based on the hierarchical representation of the object comprises:

generating the trajectory for the vehicle to travel along based on the changed hierarchical representation of the object.

12. The non-transitory computer-readable storage medium according to claim 11, wherein the second group of point cloud frames comprises a plurality of frames of point clouds, wherein determining, based on the first subset and the second subset, the first confidence that the object comprises the first part associated with the first subset and the second confidence that the object comprises the second part associated with the second subset comprises:

for each frame of point cloud in the second group of point cloud frames, determining a first probability that the object comprises the first part based on the first subset, for each frame of point cloud in the second group of point cloud frames, determining a second probability that the object comprises the second part based on the second subset, and accumulating a plurality of first probabilities and a plurality of second probabilities, respectively.

13. The non-transitory computer-readable storage medium according to claim 12, wherein determining, based on the first subset and the second subset, the first confidence that the object comprises the first part associated with the first subset and the second confidence that the object comprises the second part associated with the second subset further comprises:

for each frame of point cloud in the second group of point cloud frames, determining a first association probability that the object comprises the first part according to the first subset and the second subset, for each frame of point cloud in the second group of point cloud frames, determining a second association probability that the object comprises the second part according to the first subset and the second subset, and accumulating the first association probabilities and the second association probabilities, respectively.

14. The non-transitory computer-readable storage medium according to claim 12, wherein determining, based on the first subset and the second subset, the first confidence that the object comprises the first part associated with the first subset and the second confidence that the object comprises the second part associated with the second subset further comprises:

determining, based on a pre-stored data set, an accuracy rate for the first probability and the second probability, respectively, for each frame of point cloud in the second group of point cloud frames.

15. The non-transitory computer-readable storage medium according to claim 11, wherein the object is a truck, the first part is a tractor of the truck, and the second part is a trailer of the truck.

* * * * *